US010868961B2

(12) United States Patent
Kuwahara et al.

(10) Patent No.: US 10,868,961 B2
(45) Date of Patent: Dec. 15, 2020

(54) IMAGING DEVICE, SOLID-STATE IMAGE SENSOR, CAMERA MODULE, DRIVE CONTROL UNIT, AND IMAGING METHOD

(71) Applicants: SONY CORPORATION, Tokyo (JP); SONY SEMICONDUCTOR SOLUTIONS CORPORATION, Kanagawa (JP)

(72) Inventors: Soichi Kuwahara, Kanagawa (JP); Yuji Tamenori, Tokyo (JP)

(73) Assignees: Sony Corporation, Tokyo (JP); Sony Semiconductor Solutions Corporation, Kanagawa (JP)

(*) Notice: Subject to any disclaimer, the term of this patent is extended or adjusted under 35 U.S.C. 154(b) by 5 days.

(21) Appl. No.: 16/319,376

(22) PCT Filed: Jul. 21, 2017

(86) PCT No.: PCT/JP2017/026410
§ 371 (c)(1),
(2) Date: Jan. 21, 2019

(87) PCT Pub. No.: WO2018/025659
PCT Pub. Date: Feb. 8, 2018

(65) Prior Publication Data
US 2019/0281221 A1 Sep. 12, 2019

(30) Foreign Application Priority Data
Aug. 5, 2016 (JP) ................. 2016-154248

(51) Int. Cl.
H04N 5/232 (2006.01)
G03B 5/00 (2006.01)
H04N 5/265 (2006.01)

(52) U.S. Cl.
CPC .......... *H04N 5/23267* (2013.01); *G03B 5/00* (2013.01); *H04N 5/232* (2013.01);
(Continued)

(58) Field of Classification Search
CPC .... H04N 5/23267; H04N 5/232; H04N 5/265; H04N 5/23287; H04N 5/23258;
(Continued)

(56) References Cited

U.S. PATENT DOCUMENTS 5,101,230 A 3/1992 Shikaumi et al.
2007/0147706 A1* 6/2007 Sasaki ................ H04N 5/23248
382/295
(Continued)

FOREIGN PATENT DOCUMENTS

CN 105191283 A 12/2015
EP 2981062 A1 2/2016
(Continued)

OTHER PUBLICATIONS

International Search Report and Written Opinion of PCT Application No. PCT/JP2017/026410, dated Oct. 17, 2017, 9 pages of ISRWO.

*Primary Examiner* — Albert H Cutler
(74) *Attorney, Agent, or Firm* — Chip Law Group

(57) ABSTRACT

Provided is an imaging device, a solid-state image sensor, a camera module, a drive control unit, and an imaging method by which an effect of motion on an image can be corrected. The drive control unit controls drive of at least one of an optical system or an imaging unit by finding, on the basis of motion of the imaging unit that is physically detected, an amount of movement at the time at least one of the optical system or the imaging unit is moved relative to another to optically correct blurring appearing in the image captured by the imaging unit. A signal processing unit performs signal
(Continued)

processing for correcting an effect of the motion of the imaging unit on the image based on position information and motion information synchronized with each coordinate on the image.

13 Claims, 33 Drawing Sheets

(52) U.S. Cl.
CPC ..... *H04N 5/23258* (2013.01); *H04N 5/23287* (2013.01); *H04N 5/265* (2013.01)

(58) Field of Classification Search
CPC ........... H04N 5/23248; H04N 5/23264; H04N 5/2327; H04N 5/23274; H04N 5/23277; H04N 5/2328; H04N 5/2329; G03B 5/00
USPC ...................................................... 348/208.5
See application file for complete search history.

(56) References Cited

U.S. PATENT DOCUMENTS

| | | | | |
|---|---|---|---|---|
| 2008/0030587 | A1* | 2/2008 | Helbing | H04N 5/23258 348/208.4 |
| 2008/0309777 | A1* | 12/2008 | Aoyama | G06K 9/4647 348/222.1 |
| 2013/0293752 | A1* | 11/2013 | Peng | H04N 5/3535 348/295 |
| 2014/0049658 | A1* | 2/2014 | Yamazaki | H04N 5/23267 348/208.11 |
| 2016/0057352 | A1 | 2/2016 | Yoneda et al. | |
| 2016/0269640 | A1* | 9/2016 | Watanabe | H04N 5/23245 |
| 2016/0353027 | A1* | 12/2016 | Yoo | H04N 5/23267 |
| 2016/0360111 | A1* | 12/2016 | Thivent | H04N 5/23267 |

FOREIGN PATENT DOCUMENTS

| | | |
|---|---|---|
| JP | 01-298332 A | 12/1989 |
| JP | 2016-024235 A | 2/2016 |
| KR | 10-2015-0135771 A | 12/2015 |
| TW | 201448594 A | 12/2014 |
| WO | 2014/156731 A1 | 10/2014 |

\* cited by examiner

IMAGING DEVICE, SOLID-STATE IMAGE SENSOR, CAMERA MODULE, DRIVE CONTROL UNIT, AND IMAGING METHOD

CROSS REFERENCE TO RELATED APPLICATIONS

This application is a U.S. National Phase of International Patent Application No. PCT/JP2017/026410 filed on Jul. 21, 2017, which claims priority benefit of Japanese Patent Application No. JP 2016-154248 filed in the Japan Patent Office on Aug. 5, 2016. Each of the above-referenced applications is hereby incorporated herein by reference in its entirety.

TECHNICAL FIELD

The present disclosure relates to an imaging device, a solid-state image sensor, a camera module, a drive control unit, and an imaging method, and more particularly to an imaging device, a solid-state image sensor, a camera module, a drive control unit, and an imaging method by which an effect of motion on an image can be reliably corrected.

BACKGROUND ART

Optical image stabilizer (OIS) or electronic image stabilization (EIS) has been used as a technique for correcting camera shake in an imaging device. The optical image stabilizer can correct blurring by moving one of a lens and an imaging element relative and parallel to another depending on an amount of blurring and shifting the position of an image on the imaging element. The electronic image stabilization can correct blurring by cutting an image captured by an imaging element as an output image and shifting the cut position depending on an amount of blurring.

Now, actual camera shake is mainly caused by rotational motion and is less influenced by parallel movement where, in particular, the influence of parallel movement decreases as the distance to a subject increases. The technique of optical image stabilizer corrects the rotational motion by parallel movement of the lens or imaging element, so that the edge may be deformed in some cases. Similarly, the electronic image stabilization performs correction that causes parallel movement of the cut position, thereby having a problem that the edge is deformed.

Furthermore, no measure has been taken against deformation (a focal plane phenomenon) caused by a difference in the amount of movement within one screen due to a gap in exposure time for each pixel line that occurs in an imaging element using a rolling shutter such as a complementary metal oxide semiconductor (CMOS) image sensor.

Thus, as disclosed in Patent Document 1, there has been proposed an imaging device that can perform image stabilization while accommodating a difference in the amount of movement due to the position within an image plane and a difference in the amount of movement due to a gap in exposure time within one screen. Adoption of such image stabilization can correct camera shake very accurately from the center to the edge, and can also correct deformation caused by the focal plane phenomenon.

CITATION LIST

Patent Document

Patent Document 1: International Publication No. 2014/156731 pamphlet

SUMMARY OF THE INVENTION

Problems to be Solved by the Invention

Now, in a case where imaging is performed with a short exposure time such as in the daytime outdoors, the effect of camera shake is almost completely corrected by performing the image stabilization of Patent Document 1 above so that the occurrence of blurring and deformation in an image can be reduced. However, in a case where imaging is performed with a long exposure time such as in a dark place or at night, the occurrence of blurring and deformation in an image can be corrected by performing the image stabilization of Patent Document 1 above, but it is difficult to reduce the occurrence of blurring of a point image during exposure (hereinafter referred to as blurring within the exposure time).

The present disclosure has been made in view of the above circumstances, and an object of the present disclosure is to reduce the occurrence of blurring within the exposure time and be able to reliably correct the effect of motion on an image.

Solutions to Problems

An imaging device according to one aspect of the present disclosure includes: an imaging unit that captures an image of a subject via an optical system collecting light from the subject; a drive control unit that controls drive of at least one of the optical system or the imaging unit by finding, on the basis of motion of the imaging unit that is physically detected, an amount of movement at the time at least one of the optical system or the imaging unit is moved relative to another to optically correct blurring appearing in the image captured by the imaging unit; and a signal processing unit that performs signal processing for correcting an effect of the motion of the imaging unit on the image according to a position conversion function based on position information and motion information synchronized with each coordinate on the image, on the basis of the position information obtained by detecting a position of the optical system or the imaging unit driven according to the control by the drive control unit and the motion information indicating the motion of the imaging unit physically detected.

A solid-state image sensor according to another aspect of the present disclosure includes: an imaging unit that captures an image of a subject via an optical system collecting light from the subject; and a logic unit that performs processing of adding, to the image captured by the imaging unit, position information obtained by detecting a position of the optical system or the imaging unit driven according to control by a drive control unit and motion information indicating motion of the imaging unit physically detected, and outputs the image to which the position information and the motion information is added to a signal processing unit that performs signal processing for correcting an effect of the motion of the imaging unit on the image according to a position conversion function based on the position information and the motion information synchronized with each coordinate on the image on the basis of the position information and the motion information, the drive control unit controlling drive of at least one of the optical system or the imaging unit by finding, on the basis of the motion of the imaging unit that is physically detected, an amount of movement at the time at least one of the optical system or the imaging unit is moved relative to another to optically correct blurring appearing in the image captured by the imaging unit.

A camera module according to another aspect of the present disclosure includes: an optical system that collects light from a subject; an imaging unit that captures an image of the subject via the optical system; a drive control unit that controls drive of at least one of the optical system or the imaging unit by finding, on the basis of motion of the imaging unit that is physically detected, an amount of movement at the time at least one of the optical system or the imaging unit is moved relative to another to optically correct blurring appearing in the image captured by the imaging unit; and a logic unit that supplies position information, motion information, and timing information indicating a timing for synchronizing the position information and the motion information with a coordinate on the image to a signal processing unit together with the image captured by the imaging unit, the signal processing unit performing signal processing for correcting an effect of the motion of the imaging unit on the image according to a position conversion function based on the position information and the motion information synchronized with each coordinate on the image on the basis of the position information obtained by detecting a position of the optical system or the imaging unit driven according to the control by the drive control unit and the motion information indicating the motion of the imaging unit physically detected.

A drive control unit according to another aspect of the present disclosure controls drive of at least one of an optical system or an imaging unit by finding, on the basis of physically detected motion of the imaging unit capturing an image of a subject via the optical system collecting light from the subject, an amount of movement at the time at least one of the optical system or the imaging unit is moved relative to another to optically correct blurring appearing in the image captured by the imaging unit, and supplies position information, which is obtained by detecting a position of the optical system or the imaging unit driven according to the control, and motion information, which indicates the physically detected motion of the imaging unit, to a logic unit that performs processing of adding the position information and the motion information to the image captured by the imaging unit and outputs the image to which the position information and the motion information is added to a signal processing unit that performs signal processing for correcting an effect of the motion of the imaging unit on the image according to a position conversion function based on the position information and the motion information synchronized with each coordinate on the image on the basis of the position information and the motion information.

An imaging method according to another aspect of the present disclosure includes the steps of: controlling drive of at least one of an optical system or an imaging unit by finding, on the basis of physically detected motion of the imaging unit capturing an image of a subject via the optical system collecting light from the subject, an amount of movement at the time at least one of the optical system or the imaging unit is moved relative to another to optically correct blurring appearing in the image captured by the imaging unit; and performing signal processing for correcting an effect of the motion of the imaging unit on the image according to a position conversion function based on position information and motion information synchronized with each coordinate on the image on the basis of the position information obtained by detecting a position of the optical system or the imaging unit driven according to the control and the motion information indicating the physically detected motion of the imaging unit.

According to one aspect of the present disclosure, the drive of at least one of the optical system or the imaging unit is controlled by finding, on the basis of the physically detected motion of the imaging unit capturing the image of the subject via the optical system collecting light from the subject, the amount of movement at the time at least one of the optical system or the imaging unit is moved relative to another to optically correct blurring appearing in the image captured by the imaging unit. Then, the signal processing for correcting an effect of the motion of the imaging unit on the image is performed according to the position conversion function based on the position information and the motion information synchronized with each coordinate on the image, on the basis of the position information obtained by detecting the position of the optical system or the imaging unit driven according to the control by the drive control unit and the motion information indicating the motion of the imaging unit physically detected.

Effects of the Invention

According to one aspect of the present disclosure, the effect of motion on an image can be reliably corrected.

MODES FOR CARRYING OUT THE INVENTION

First, before describing an imaging device to which the present technology is applied, vibration and image stabilization processing of an imaging device will be described with reference to FIGS. 1A, 1B, 1C, 2, 3, 4, 5, 6, 7, 8, 10, 11, and 12.

<Regarding Vibration and Image Stabilization Processing of Imaging Device>

Figure 1A:
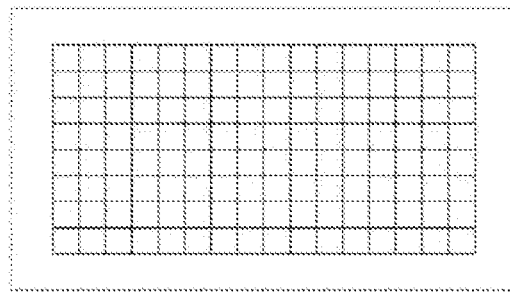
FIGS. 1A, 1B, and 1C are diagrams illustrating an example of distortion occurring in an image subjected to the effect of lens distortion.
Figure 1B:
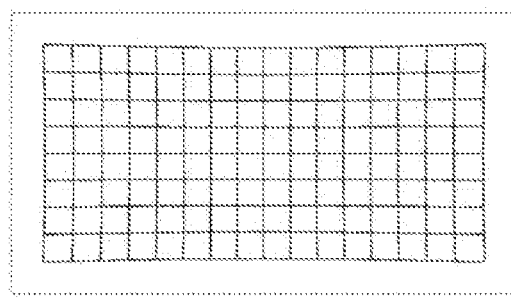

FIGS. 1A and 1B illustrate an example of distortion occurring in an image due to an effect of lens distortion when a subject is imaged by an imaging device.

Figure 1C:
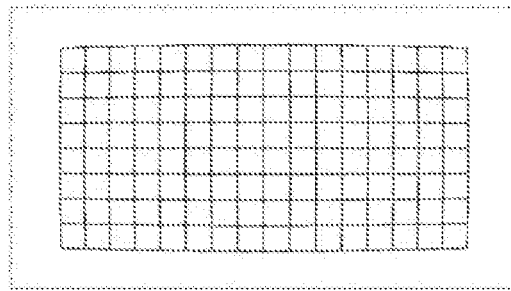

For example, when a lattice pattern as illustrated in A of FIG. 1A is imaged as the subject, pincushion distortion with the edge portion shrinking inward as illustrated in FIG. 1B or barrel distortion with the edge portion stretching outward as illustrated in FIG. 1C occurs.

Figure 2:
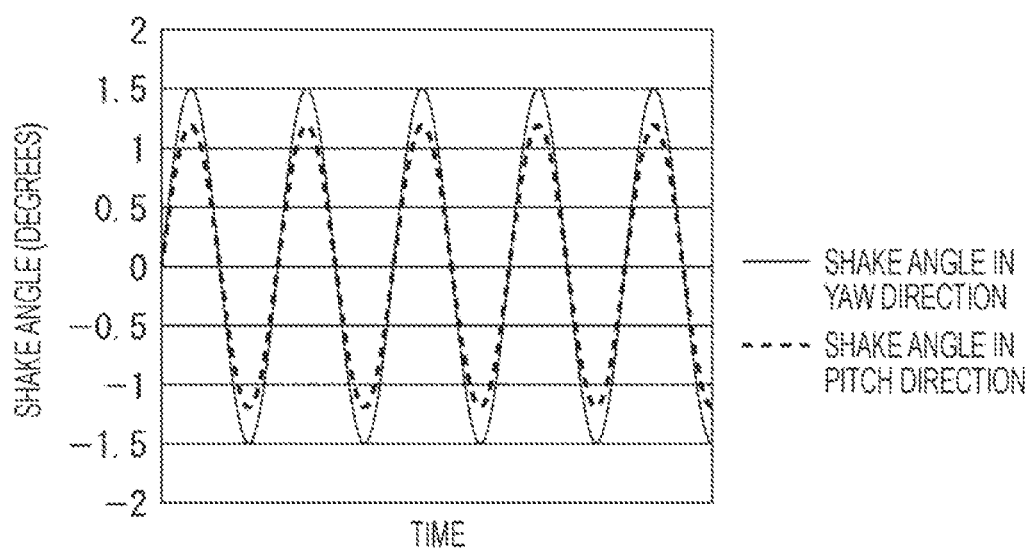
FIG. 2 is a graph illustrating vibration conditions applied to an imaging device.

The following description describes blurring that occurs in an image when the imaging device with the pincushion lens distortion as illustrated in FIG. 1B performs imaging while applying vibration under vibration conditions (the shake angle in a yaw direction: 1.5 degrees, and the shake angle in a pitch direction: 1.2 degrees) as illustrated in FIG. 2. The left side of each of FIGS. 3 to 12 illustrates four images captured in the vicinity of the minimum shake angle (for example, two points where the shake angle is 0 degree) and in the vicinity of the maximum shake angle (for example, two points where the shake angles in the yaw direction are 1.5 degrees and −1.5 degrees) in one cycle of vibration illustrated in FIG. 2. Moreover, the right side of each of FIGS. 3 to 12 illustrates an image obtained by superimposing these four images.

Figure 3:
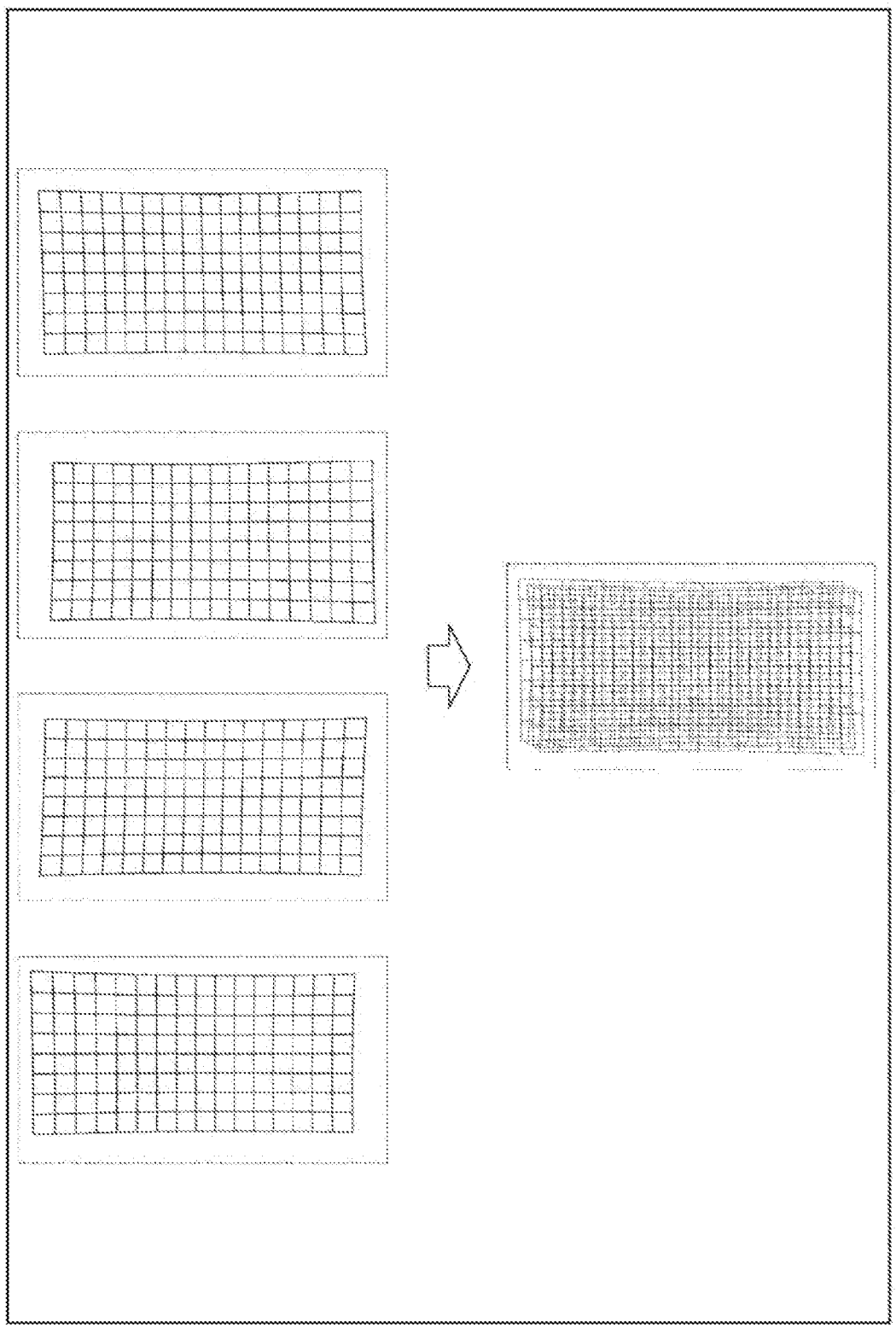
FIG. 3 is a diagram illustrating an example of an image that is output without blurring being corrected.

FIG. 3 illustrates an example of an image that is output without being subjected to correction processing of correcting blurring with respect to vibration.

As illustrated in FIG. 3, various deformations depending on the positions within an image plane occur due to the effects of misalignment, edge deformation, and rolling shutter caused by vibration of the imaging device.

Figure 4:
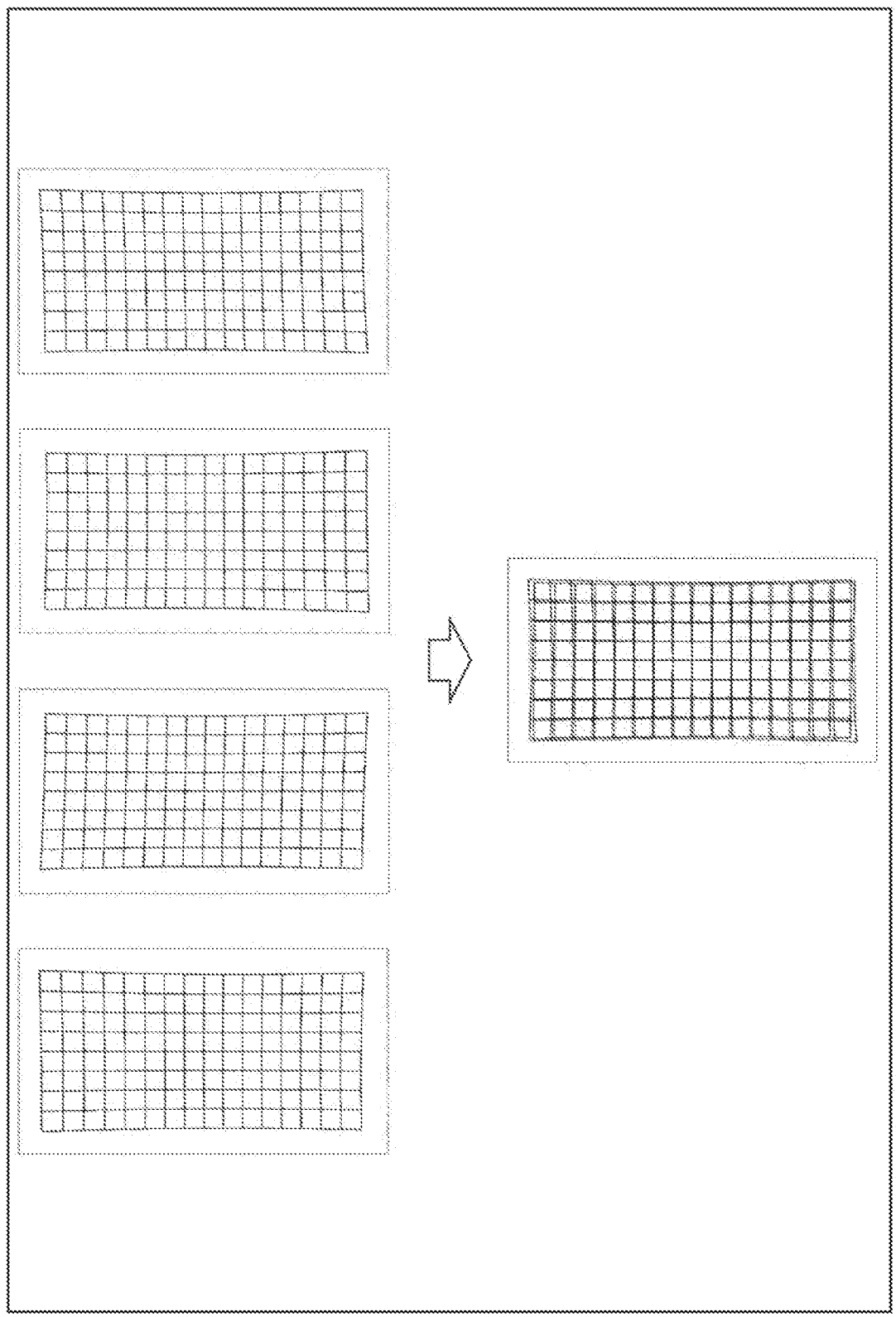
FIG. 4 is a diagram illustrating an example of an image on which correction processing is performed according to normal electronic image stabilization.

FIG. 4 illustrates an example of an image on which correction processing is performed according to normal electronic image stabilization. Here, the normal electronic image stabilization is to correct blurring by cutting an image captured by an imaging element as an output image and shifting the cut position depending on the amount of blurring, and is different from correction processing of Patent Document 1 and Patent Document 2 as described later.

As illustrated on the left side of FIG. 4, the correction processing is performed according to normal electronic image stabilization to output images with the cut positions shifted depending on the amount of blurring. The image is thus corrected such that, when these images are superimposed, the positions of the images coincide at the center of a screen among frames as illustrated on the right side of FIG. 4. However, the correction processing according to the normal electronic image stabilization cannot correct the effect of rolling shutter and the edge deformation caused by camera shake.

Figure 5:
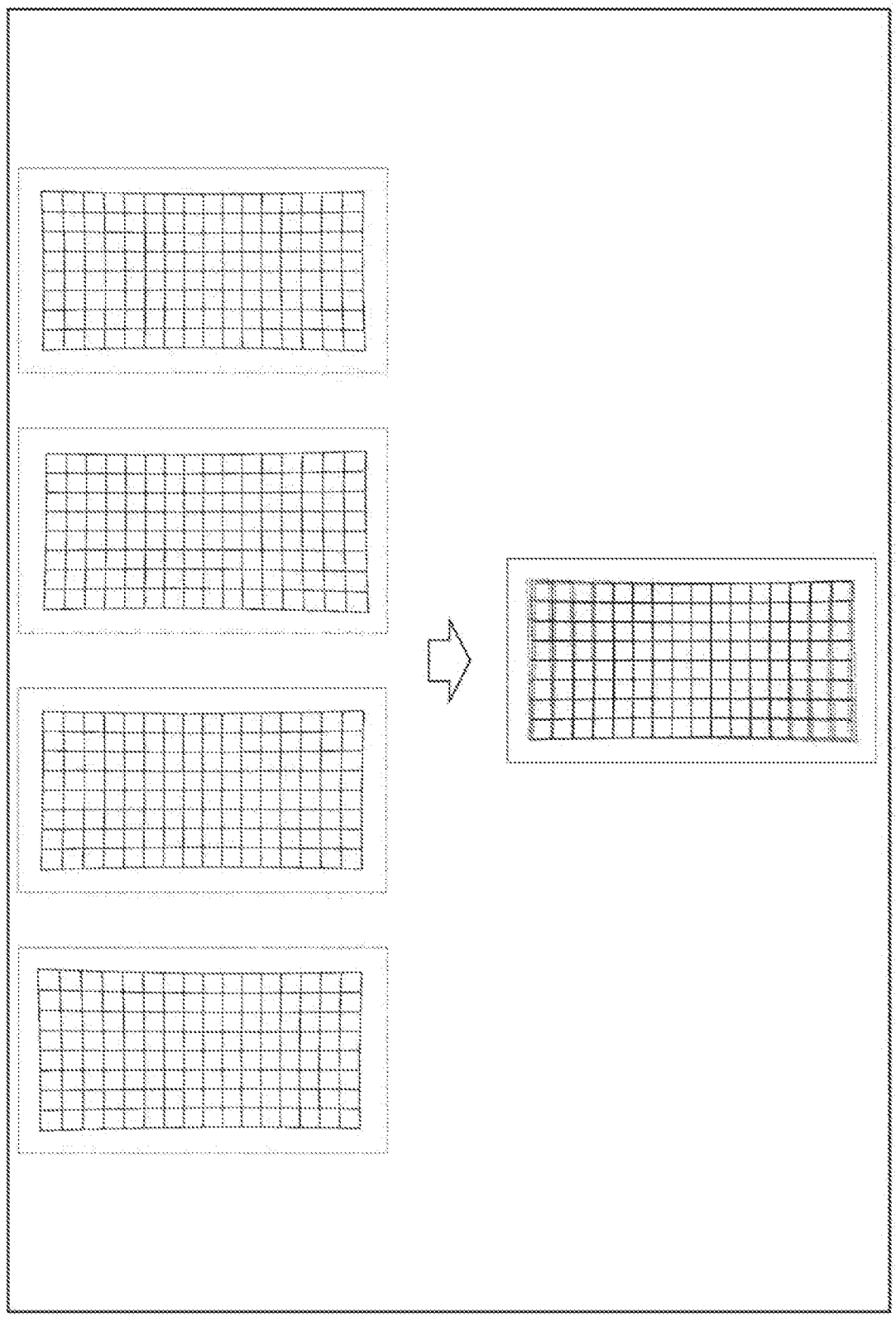
FIG. 5 is a diagram illustrating an example of an image on which correction processing is performed according to optical image stabilizer.

FIG. 5 illustrates an example of an image on which correction processing is performed according to optical image stabilizer.

As illustrated on the left side of FIG. 5, the correction processing is performed according to optical image stabilizer to output images that are captured by moving one of a lens and an imaging element relative and parallel to another depending on the amount of blurring. Thus, when these images are superimposed, as illustrated on the right side of FIG. 5, the positions of the images among frames at the center of a screen can be corrected and at the same time the effect of rolling shutter can be corrected. In this case, however, the edge deformation due to camera shake cannot be corrected.

Note that with optical image stabilizer (employing the barrel shift method or sensor shift method), the effect of edge deformation and lens distortion remains, but the occurrence of blurring within the exposure time can be reduced by performing the correction processing to follow vibration even during exposure.

Figure 6:
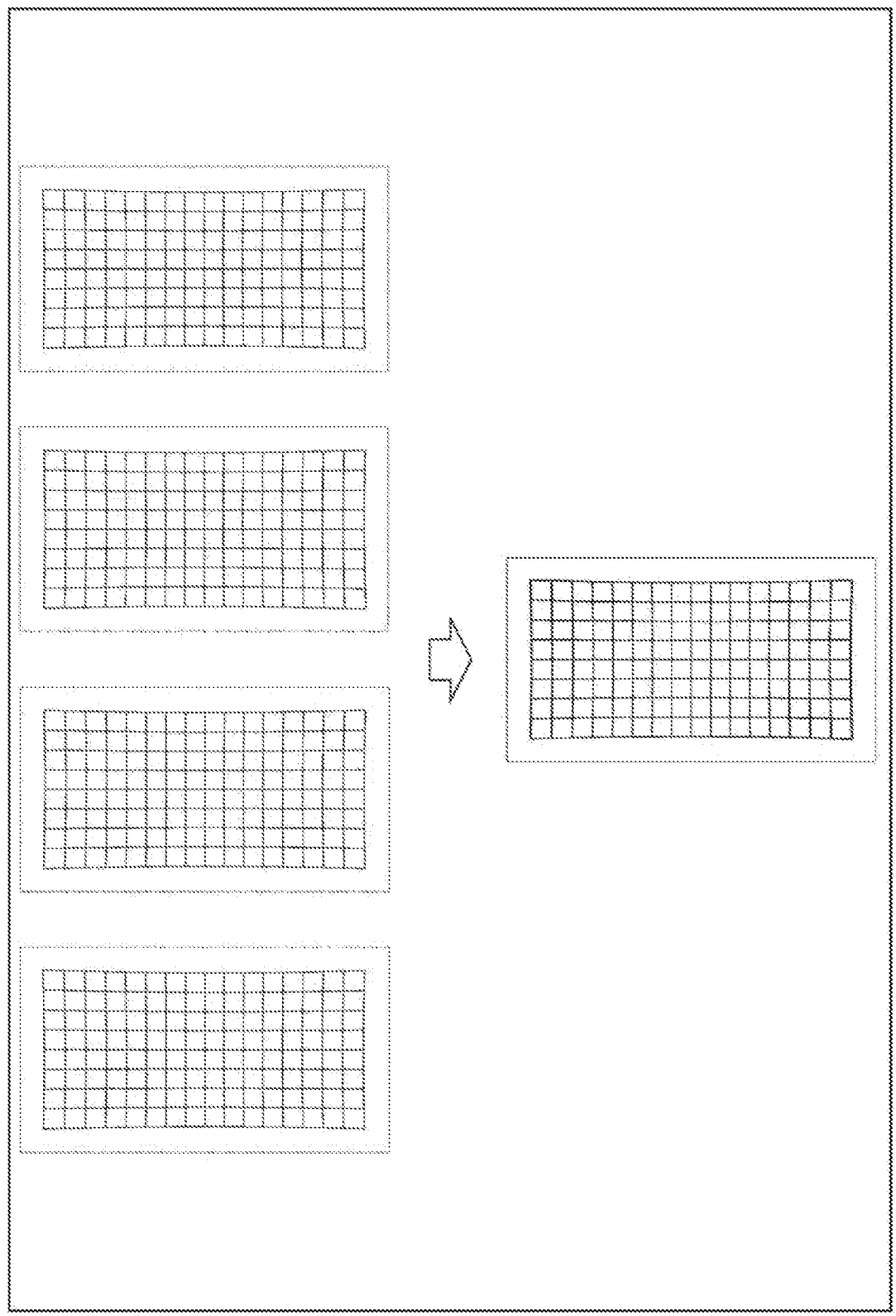
FIG. 6 is a diagram illustrating an example of an image on which correction processing is performed according to image stabilization proposed in Patent Document 1.

FIG. 6 illustrates an example of an image on which correction processing is performed according to image stabilization proposed in Patent Document 1 described above. In addition to shifting the cut position as in the case of the normal electronic image stabilization, the image stabilization disclosed in Patent Document 1 performs deformation for each pixel position according to a difference in the amount of movement due to the position within the image plane and a difference in the amount of movement due to a gap in exposure time within one screen.

As illustrated in FIG. 6, the correction processing according to image stabilization proposed in Patent Document 1 is performed to reliably correct blurring from the center to the edge of the image. Note that the correction processing does not consider the effect of lens distortion, whereby an actual imaging result has an error due to the effect of lens distortion and some misalignment occurring in the edge portion. Note that this misalignment varies depending on the shape of the lens distortion.

Now, as previously filed as PCT/JP2016/070261 (hereinafter referred to as Patent Document 2), there is proposed correction processing that can perform image stabilization in consideration of the effect of lens distortion.

An image on which the correction processing is performed according to the image stabilization proposed in Patent Document 2 will be described with reference to FIGS. 7 and 8.

Figure 7:
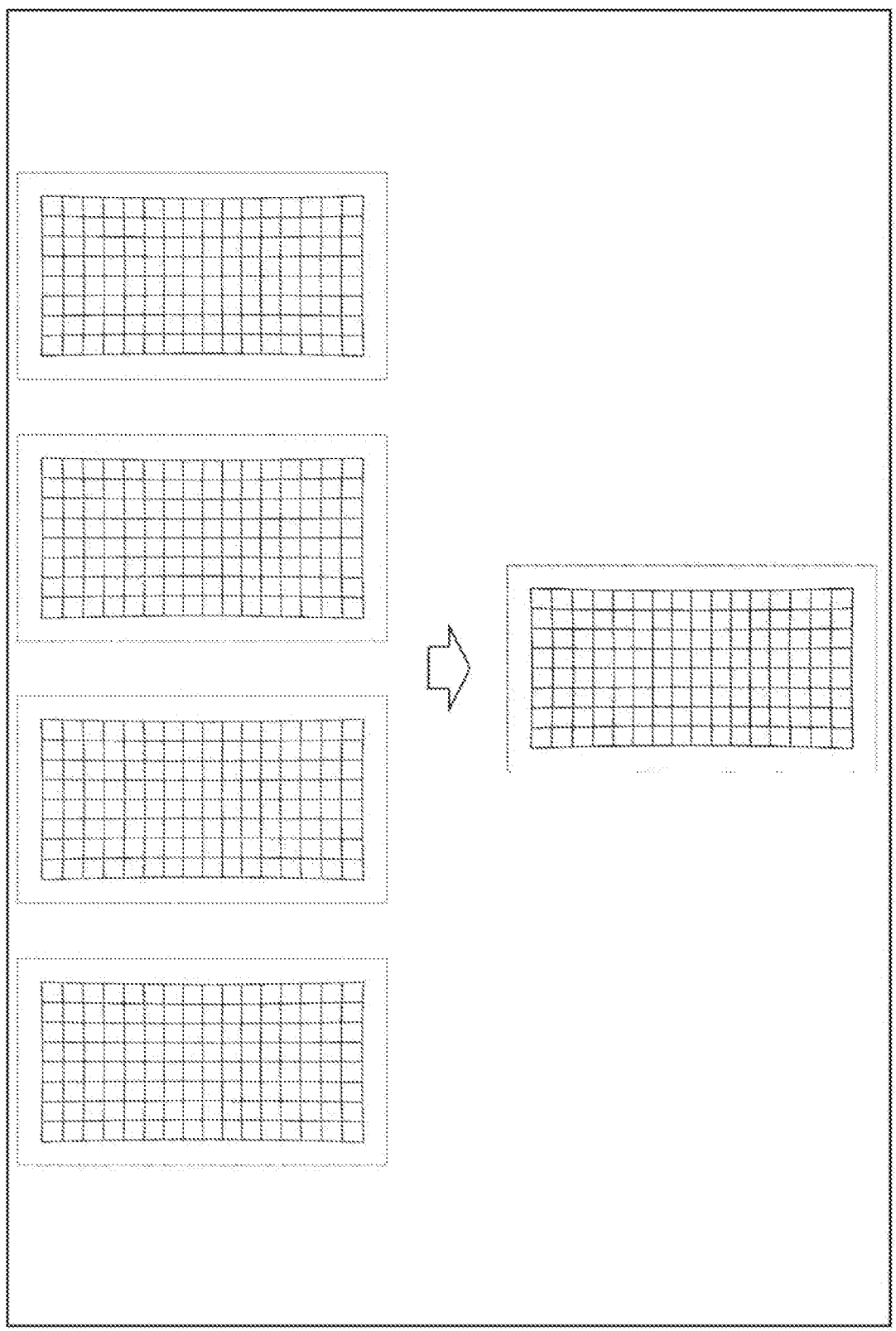
FIG. 7 is a diagram illustrating an example of an image on which correction processing is performed according to image stabilization proposed in Patent Document 2 and in which a correction is not performed against lens distortion itself.

FIG. 7 illustrates an example of an image on which the correction processing is performed according to the image stabilization of Patent Document 2 and in which a correction is performed against deformation due to camera shake caused by the effect of lens distortion but is not performed against the lens distortion itself.

As illustrated in FIG. 7, the correction processing according to the image stabilization proposed in Patent Document 2 is performed to reliably correct blurring from the center to the edge of the image.

Figure 8:
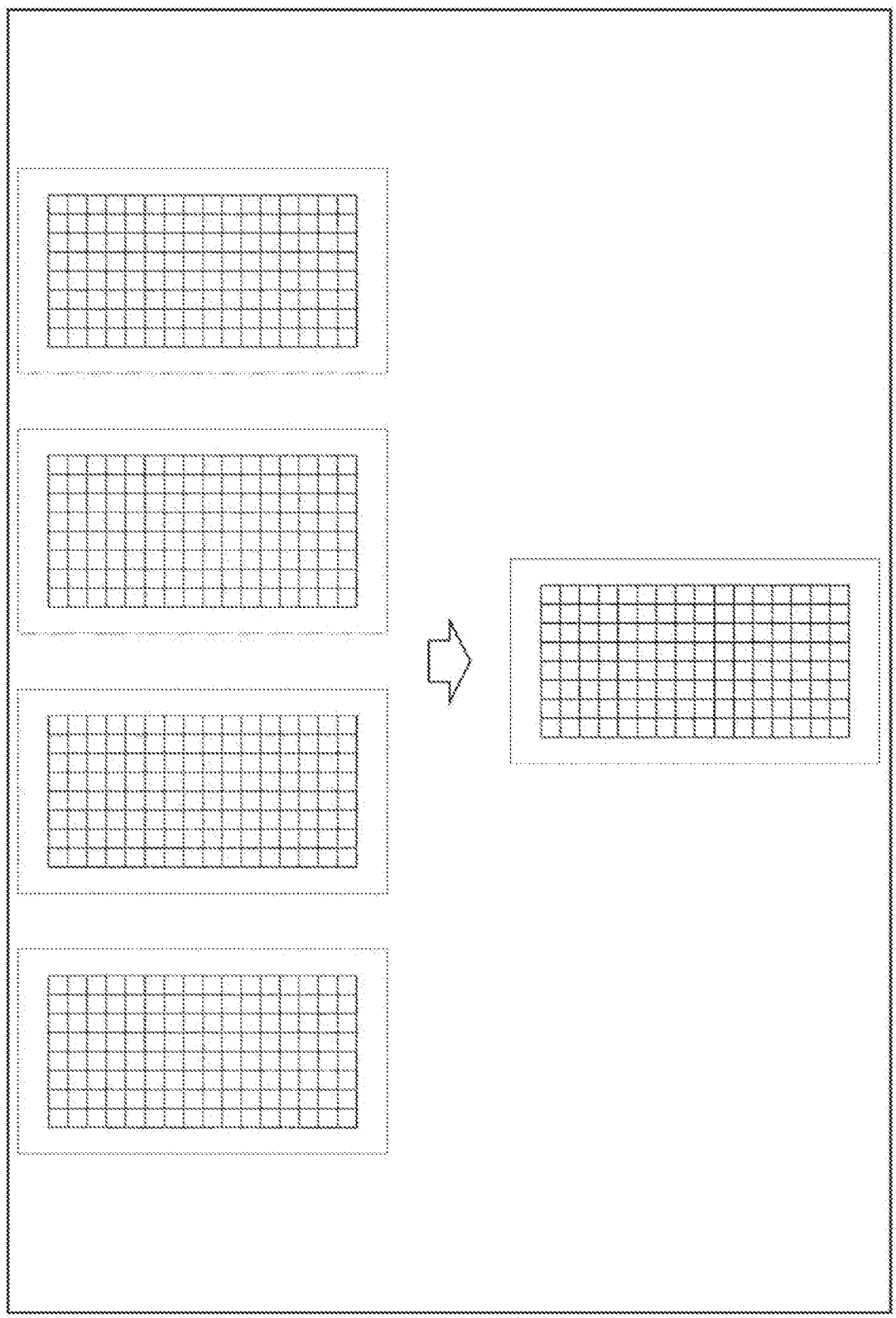
FIG. 8 is a diagram illustrating an example of an image on which correction processing is performed according to image stabilization proposed in Patent Document 2 and in which a correction is performed against lens distortion itself.

FIG. 8 illustrates an image on which the correction processing is performed according to the image stabilization of Patent Document 2 and in which a correction is performed against deformation due to camera shake caused by the effect of lens distortion and is also performed against the lens distortion itself.

As illustrated in FIG. 8, the correction processing according to the image stabilization proposed in Patent Document 2 is performed to reliably correct blurring from the center to the edge of the image with the lens distortion being corrected.

Now, in a case where imaging is performed with a short exposure time such as in the daytime outdoors, the correction processing according to the image stabilization proposed in Patent Document 2 can almost perfectly perform image stabilization. On the other hand, in a case where imaging is performed with a long exposure time such as in a dark place or at night, blurring within the exposure time occurs.

Figure 9:
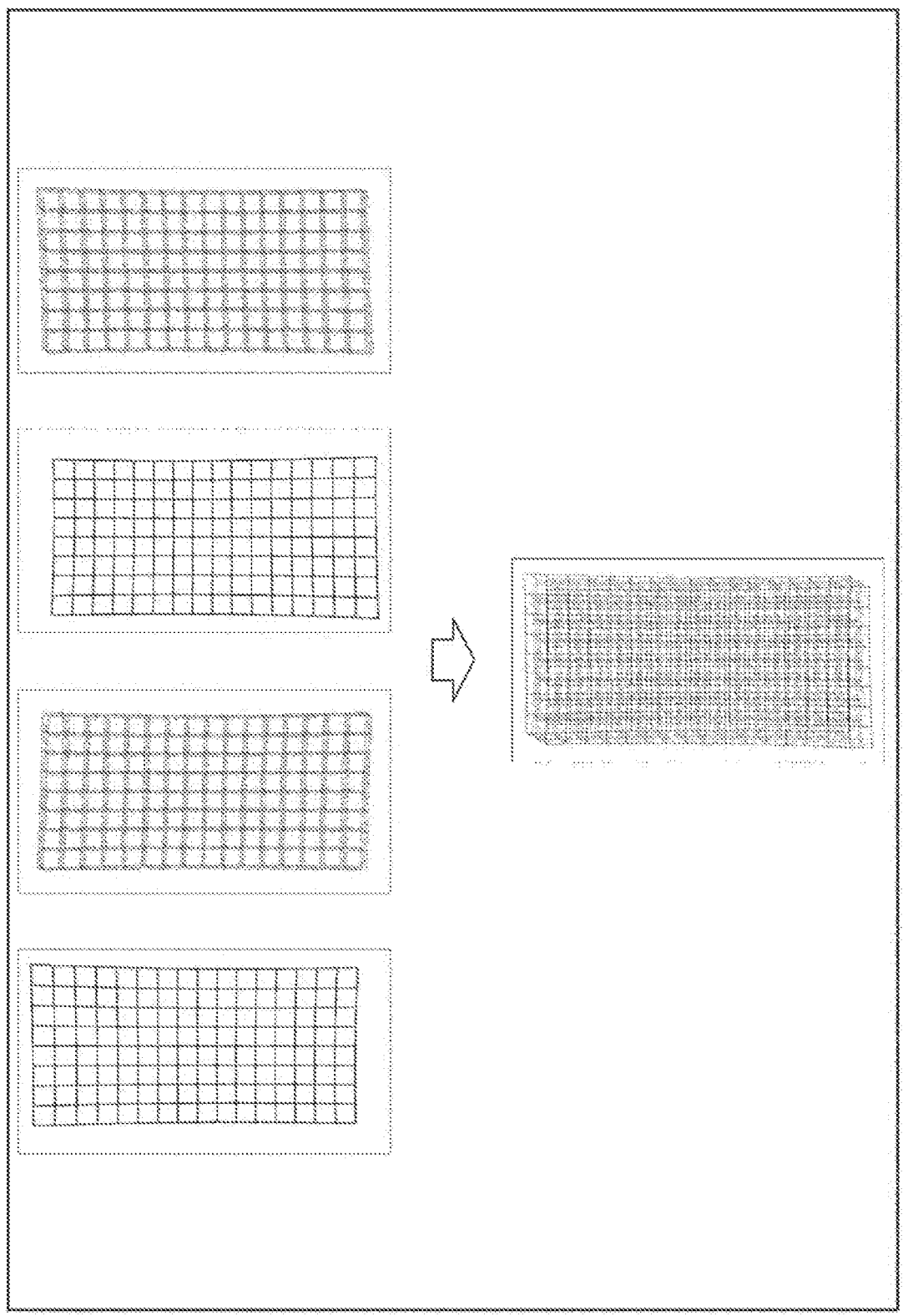
FIG. 9 is a diagram illustrating an example of an image that is output without blurring being corrected in a case where imaging is performed with a long exposure time.

FIG. 9 illustrates an image that is output without blurring being corrected as in FIG. 3 in a case where imaging is performed with a long exposure time.

As illustrated in FIG. 9, imaging performed with a long exposure time causes blurring within the exposure time in addition to various deformations depending on the positions within an image plane due to the effects of misalignment, edge deformation, and rolling shutter.

Figure 10:
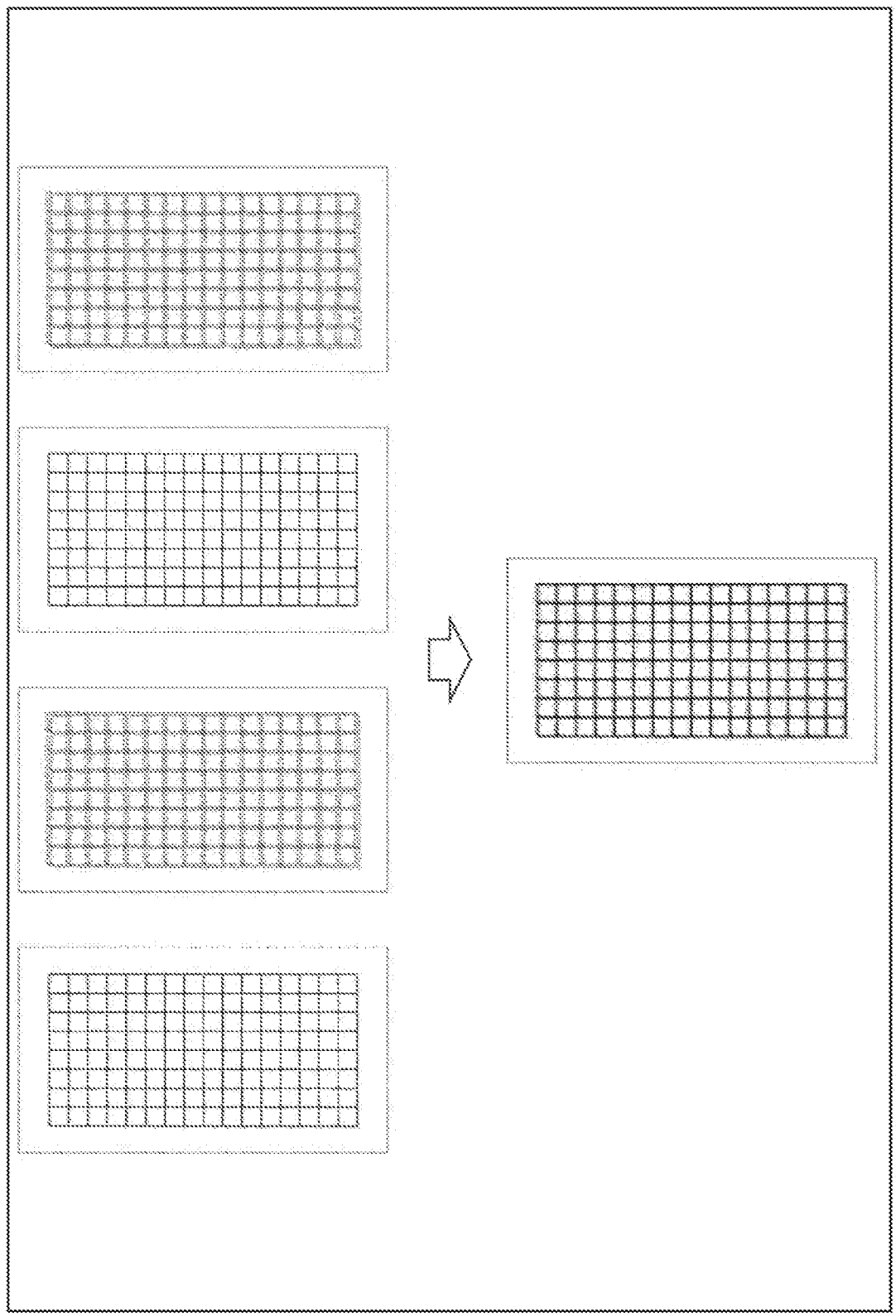
FIG. 10 is a diagram illustrating an example of an image on which correction processing is performed according to image stabilization proposed in Patent Document 2 and in which a correction is made against lens distortion in a case where imaging is performed with a long exposure time.

FIG. 10 illustrates an image on which the correction processing is performed according to the image stabilization of Patent Document 2 and in which a correction is performed against deformation due to camera shake caused by the effect of lens distortion and is also performed against the lens distortion in a case where imaging is performed with a long exposure time.

Even with the correction processing according to the image stabilization proposed in Patent Document 2, camera shake is not reliably corrected in the image due to the occurrence of blurring within the exposure time, though the positions of images coincide after the correction. In other words, while the blurring is successfully corrected from the center to the edge of the image with the lens distortion being corrected, the image has blurring within the exposure time.

Figure 11:
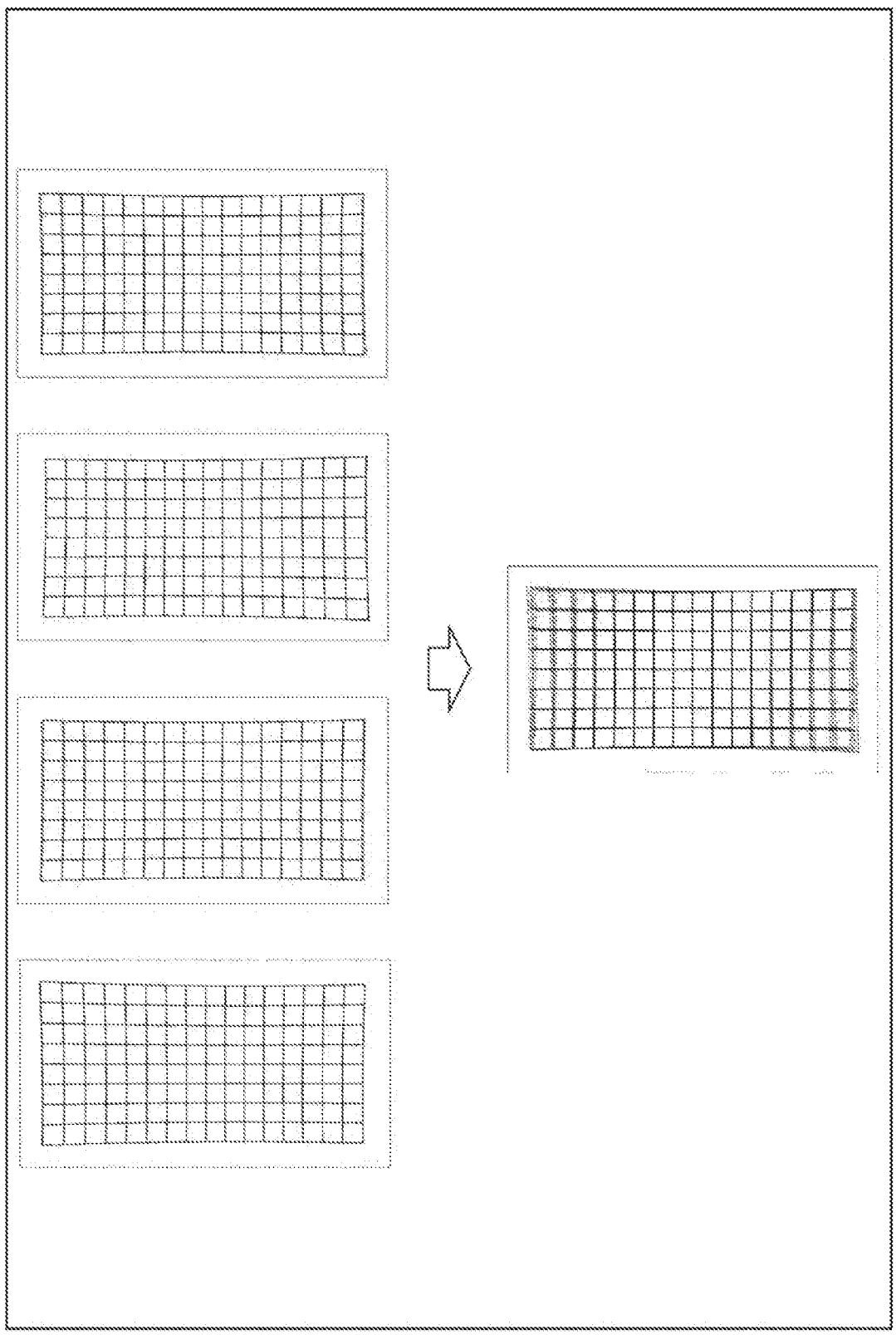
FIG. 11 is a diagram illustrating an example of an image on which correction processing is performed according to optical image stabilizer in a case where imaging is performed with a long exposure time.

Moreover, FIG. 11 illustrates an image on which correction processing is performed according to the optical image stabilizer (employing the barrel shift method or sensor shift method) in a case where imaging is performed with a long exposure time.

As illustrated in FIG. 11, the correction processing according to the optical image stabilizer cannot correct the edge deformation due to camera shake but can reduce the occurrence of blurring within the exposure time by moving a lens and an imaging element relative to each other even during the exposure time.

Accordingly, the applicant of the present application proposes correction processing that more reliably corrects image blurring by reducing the effect of camera shake on an image even in a case of a long exposure time, as with an imaging device 11 of FIG. 13 and an imaging device 11A of FIG. 17 as described later. This correction processing can reliably correct blurring from the center to the edge of an image with lens distortion being corrected, and can also reduce the occurrence of blurring within the exposure time.

Figure 12:
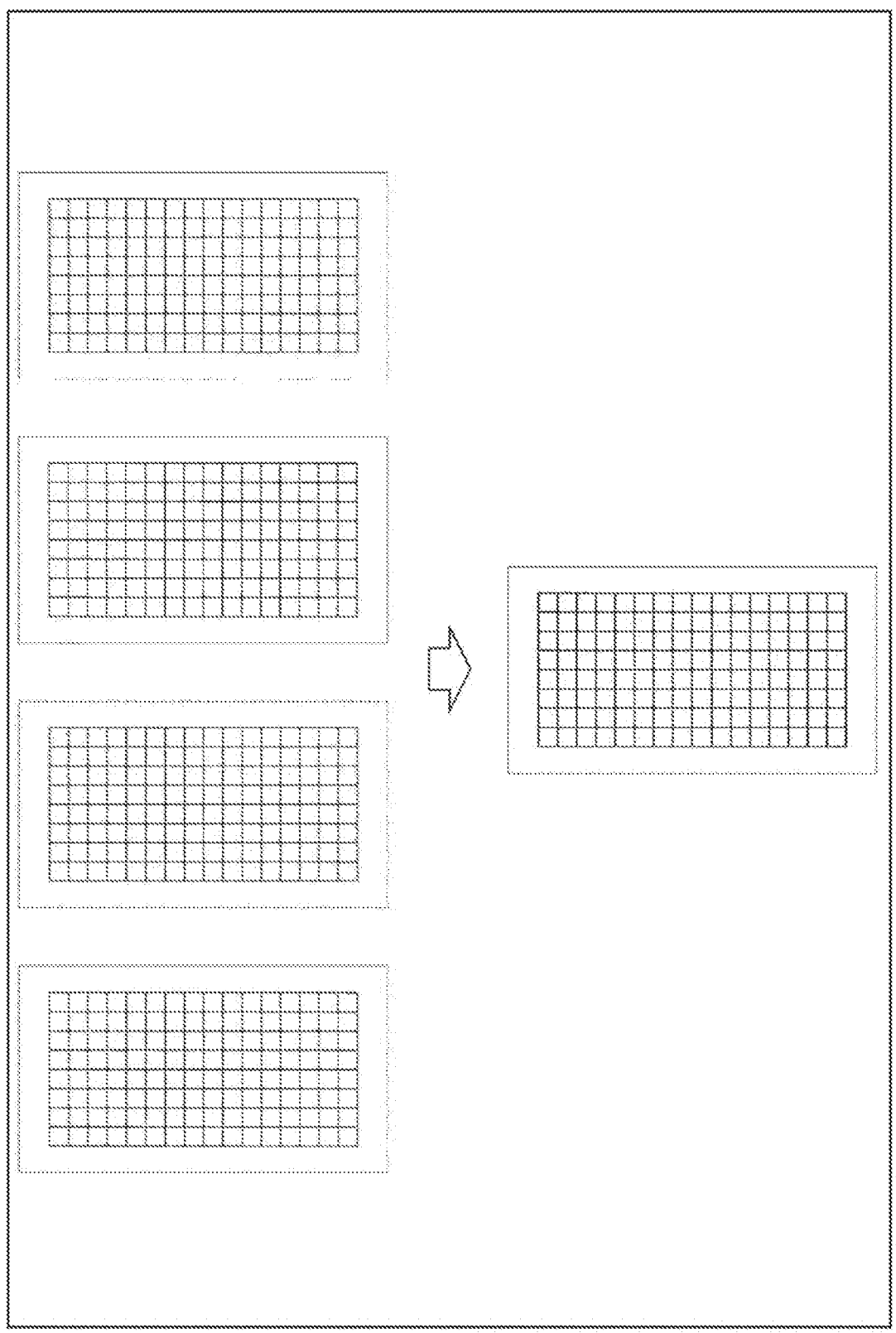
FIG. 12 is a diagram illustrating an example of an image on which correction processing is performed according to image stabilization by an imaging device to which the present technology is applied.

In other words, as illustrated in FIG. 12, the correction processing applying the present technology can reliably correct blurring from the center to the edge of an image with lens distortion being corrected, and can also reduce the occurrence of blurring within the exposure time. Note that exposure blurring due to edge deformation during the exposure time cannot be reduced by the optical image stabilizer, so that the blurring within the exposure time is expected to remain a little at the edge of the image depending on the vibration conditions and exposure time, but can be reduced to an extent that it is almost unnoticeable in normal imaging.

Furthermore, FIG. 12 illustrates an image in which a correction is performed against lens distortion itself as in FIG. 8. Note that although not shown in the figure, even in a case where a correction is not performed against the lens distortion itself as in FIG. 7, the blurring can be reliably corrected from the center to the edge of the image and at the same time the occurrence of blurring within the exposure time can be reduced.

<Example of Configuration of Imaging Device to which Present Technology is Applied>

A specific embodiment to which the present technology is applied will now be described in detail with reference to the drawings.

Figure 13:
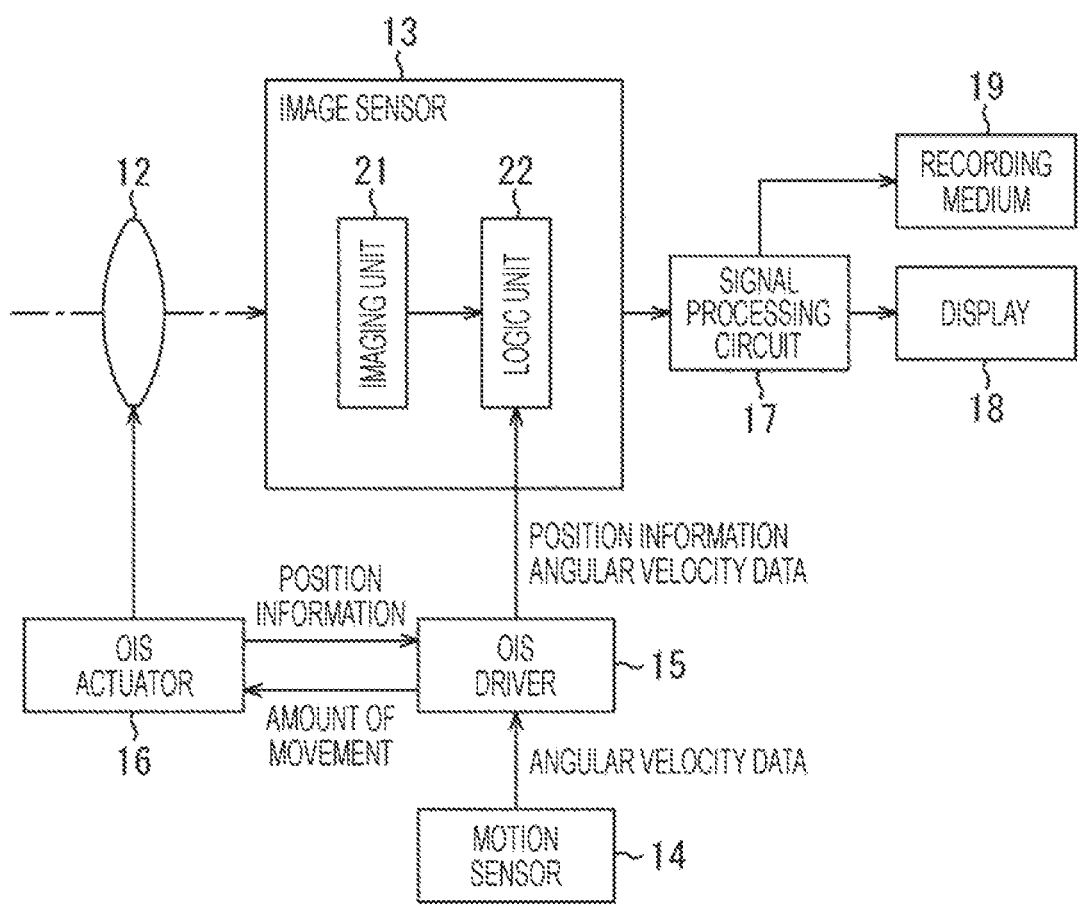
FIG. 13 is a block diagram illustrating an example of the configuration of a first embodiment of an imaging device to which the present technology is applied.

FIG. 13 is a block diagram illustrating an example of the configuration of a first embodiment of an imaging device to which the present technology is applied.

As illustrated in FIG. 13, an imaging device 11 includes a lens unit 12, an image sensor 13, a motion sensor 14, an OIS driver 15, an OIS actuator 16, a signal processing circuit 17, a display 18, and a recording medium 19.

The lens unit 12 includes one or a plurality of lenses to collect light from a subject and form an image of the subject on a sensor surface of an imaging unit 21 included in the image sensor 13.

The image sensor 13 includes a stack of a semiconductor chip forming the imaging unit 21 and a semiconductor chip forming a logic unit 22, and an interface for importing the output from the OIS driver 15 is mounted.

The imaging unit 21 captures the image of the subject formed by the lens unit 12 collecting light from the subject on the sensor surface on which a plurality of pixels is arranged in a matrix, and outputs an image acquired by the capturing.

The logic unit 22 supplies, to the signal processing circuit 17, image data obtained by adding position information of the lens unit 12 and angular velocity data output from the OIS driver 15 to the image captured by the imaging unit 21 together with timing information which indicates the timing for synchronizing the position information and the angular velocity data with coordinates on the image.

Specifically, the logic unit 22 receives the angular velocity data detected by the motion sensor 14 and the position information of the lens unit 12 subjected to drive by the OIS actuator 16 at a predetermined sampling frequency (for example, 1 kHz) from the OIS driver 15. The logic unit 22 then adds, to the image data, the position information of the lens unit 12 and the angular velocity data as well as an H-line counter of the image data at the timing the position information and the angular velocity data are received, thereby outputting the outcome. The position information of the lens unit 12, the angular velocity data, and the H-line counter may of course be output separately along with the image without being added to the image. The position information of the lens unit 12 and the angular velocity data are associated line by line in the horizontal direction of the image data as described above, whereby the signal processing circuit 17 can synchronize the angular velocity data and the position information with the position in the vertical direction on the image. In other words, the H-line counter is used as the timing information for achieving the above synchronization.

Here, the H-line counter of the image data is, for example, a counter which is reset for each frame at a predetermined timing and incremented by one each time one line in the horizontal direction is read, and is used for timing the position in the vertical direction on the image. Note that the H-line counter also counts in a blank section where no image is read. Moreover, in addition to the H-line counter of the image data, time information such as a time stamp may be used as the timing information, for example. Note that a method of synchronizing the angular velocity data and the position information with the position in the vertical direction on the image is described in detail in Patent Document 2 above.

The motion sensor 14 physically (that is, not by image processing) detects motion of the imaging unit 21 and outputs information representing the motion. For example, in a case where the motion sensor 14 includes a gyro sensor that can detect angular velocities in three axial directions, the motion sensor outputs angular velocity data represented by those angular velocities as information representing the motion of the imaging device 11.

Note that in addition to the sensor for OIS control, for example, a simple gyro sensor, a gyro sensor shared as one for OIS control (that is, one having two ports), or the like can be used as the motion sensor 14. Moreover, the motion sensor 14 is not limited to a gyro sensor but can be a six-axis sensor or the like capable of outputting acceleration data in addition to the angular velocity data in three axial directions.

On the basis of the angular velocity data output from the motion sensor 14, the OIS driver 15 calculates an amount of movement by which the lens unit 12 is moved to optically cancel the occurrence of blurring in the image captured by the imaging unit 21. Then, the OIS driver 15 supplies the amount of movement calculated to the OIS actuator 16, and performs control such that the lens unit 12 is disposed at a predetermined position according to the amount of movement. The OIS driver 15 further acquires the position information of the lens unit 12 driven by the OIS actuator 16, and outputs the position information of the lens unit 12 and the angular velocity data to the image sensor 13.

The OIS actuator 16 drives the lens unit 12 according to the amount of movement supplied from the OIS driver 15 to optically correct camera shake occurring in the image captured by the image sensor 13. Then, the OIS actuator 16 detects the position of the lens unit 12 being driven, and supplies the position information of the lens unit 12 to the OIS driver 15.

The signal processing circuit 17 is configured to perform correction processing similar to that of the electronic image stabilization proposed in Patent Document 2 while taking into consideration the position information of the lens unit 12. That is, on the basis of the position information of the lens unit 12 and the angular velocity data that are added to the image data supplied from the image sensor 13, the signal processing circuit 17 performs signal processing that corrects the effect of the motion of the imaging unit 21 on the image (for example, misalignment, edge deformation, distortion due to rolling shutter, deformation due to the effect of lens distortion, and the like) according to a correction function based on the position information of the lens unit 12 and the angular velocity data synchronized for each coordinate on the image. Note that the correction processing by the signal processing circuit 17 will be described later with reference to FIG. 14.

The display 18 includes a display unit such as a liquid crystal panel or an organic electro luminescence (EL) panel, for example, and displays an image output from the signal processing circuit 17.

The recording medium 19 is a memory (for example, an electronically erasable and programmable read only memory (EEPROM)) that is a built-in memory of the imaging device 11 or a removable memory detachable from the imaging device 11, and records an image output from the signal processing circuit 17.

In the imaging device 11 configured as described above, the signal processing circuit 17 can perform the correction processing according to the electronic image stabilization on the image captured by the image sensor 13 such that the occurrence of blurring is optically reduced. As a result, as illustrated in FIG. 12, the imaging device 11 reduces the occurrence of blurring within the exposure time to be able to more reliably correct image blurring (such as the misalignment, edge deformation, and distortion due to rolling shutter caused by camera shake, the deformation due to the effect of lens distortion, and the like).

Note that although the present embodiment describes the optical image stabilizer of the barrel shift type in which the lens unit 12 is driven by the OIS actuator 16, the imaging device 11 may adopt optical image stabilizer of the sensor shift type in which the image sensor 13 is driven by the OIS actuator 16. In this case, the OIS actuator 16 supplies position information of the image sensor 13 instead of the position information of the lens unit 12 to the OIS driver 15.

Moreover, the imaging device 11 of FIG. 13 is configured such that the angular velocity data output from the motion sensor 14 is supplied to the image sensor 13 via the OIS driver 15. On the other hand, for example, the imaging device 11 may be configured such that the motion sensor 14 includes two output ports used for outputting angular velocity data and supplies the angular velocity data to each of the image sensor 13 and the OIS driver 15. In this case, the angular velocity data is not supplied from the OIS driver 15 to the image sensor 13.

Alternatively, for example, the imaging device 11 may include two of the motion sensors 14, in which case the two motion sensors 14 each supply the angular velocity data to a corresponding one of the image sensor 13 and the OIS driver 15. Moreover, in this case as well, the angular velocity data is not supplied from the OIS driver 15 to the image sensor 13.

Furthermore, although the image sensor 13 and the signal processing circuit 17 are illustrated in different blocks in the imaging device 11 of FIG. 13, the imaging device may adopt a configuration in which processing by the signal processing circuit 17 is performed inside the image sensor 13, for example. That is, the image sensor 13 can have a stack structure in which a semiconductor chip forming the signal processing circuit 17 is stacked.

The correction processing according to the electronic image stabilization performed by the signal processing circuit 17 will be described with reference to FIG. 14.

Figure 14:
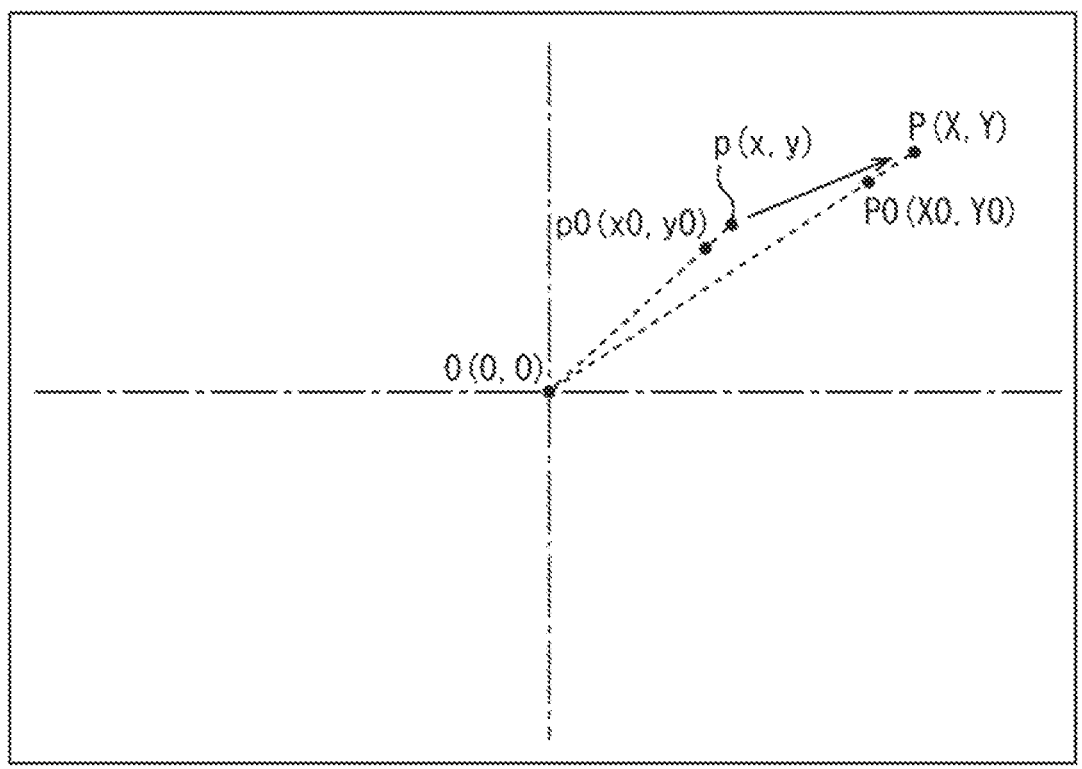
FIG. 14 is a graph for explaining correction processing performed according to electronic image stabilization by a signal processing circuit.

As illustrated in FIG. 14, the optical center of an output image of the image sensor 13 is set at a position O (0, 0). It is then assumed that the image sensor 13 rotates by an angle of rotation of −θp (rad) in the pitch direction, an angle of rotation of −θy (rad) in the yaw direction, and an angle of rotation of −θr (rad) in the roll direction. As a result of such rotation, a point p (x, y) imaged on the image sensor 13 is assumed to be moved to a point P (X, Y).

Moreover, letting a point p0 (x0, y0) be the coordinates of a point at which distortion at the point p (x, y) is corrected and a point P0 (X0, Y0) be the coordinates of a point at which distortion at the point P (X, Y) is corrected, an image stabilization relational expression disclosed in Patent Document 1 above, that is, the following expression (1), holds true.

[Expression 1]

$$\begin{cases} X0 = L \cdot (\tan(\alpha + \theta_y)) + x0 \cdot \frac{\cos\beta}{\cos(\beta + \theta_p)} + x0 \cdot \cos\theta_r - y0 \cdot \sin\theta_r - 2 \cdot x0 \\ Y0 = L \cdot (\tan(\beta + \theta_p)) + y0 \cdot \frac{\cos\alpha}{\cos(\alpha + \theta_y)} + x0 \cdot \sin\theta_r + y0 \cdot \cos\theta_r - 2 \cdot y0 \end{cases} \quad (1)$$

$$\tan\alpha = \frac{x0}{L} \quad \tan\beta = \frac{y0}{L}$$

Note that in expression (1), a focal length L is obtained by converting the focal length at the optical center position of the image sensor 13 into the number of pixels, and is a value satisfying the following expression (2) using an amount of movement d of the position O (0, 0) of the optical center when the image sensor rotates by the angle of rotation of −θ in the pitch direction or the yaw direction.

[Expression 2]

$$d = L \cdot \tan\theta \quad (2)$$

Moreover, letting a function T be the image stabilization relational expression of the above expression (1), that is, the calculation for finding the point P0 (X0, Y0) from the point p0 (x0, y0), the point P0 (X0, Y0) is expressed by the following expression (3).

[Expression 3]

$$P0(X0,Y0) = T(x0,y0,L,\theta_p,\theta_y,\theta_r) \quad (3)$$

Furthermore, letting a function U be the calculation for finding the point p0 (x0, y0) from the point p (x, y), that is, the calculation for finding at which position a point on an image subjected to the effect of lens distortion is located in a case where lens distortion is absent, the point p0 (x0, y0) is expressed by the following expression (4).

[Expression 4]

$$p0(x0,y0) = U(x,y) \quad (4)$$

Furthermore, letting a function D be the calculation for finding the point P (X, Y) from the point P0 (X0, Y0), that is, the calculation for finding at which position on an image subjected to the effect of lens distortion a point on an image in the absence of lens distortion is located, the point P (X, Y) is expressed by the following expression (5).

[Expression 5]

$$P(X,Y) = D(X0,Y0) \quad (5)$$

Then, in a case where the signal processing circuit 17 performs the correction processing to output the result in which lens distortion is corrected as illustrated in FIG. 8 above, for example, the point p0 (x0, y0) may be regarded as the point on the output image. That is, by using a pixel value at the point P (X, Y) as a pixel value at the point p0 (x0, y0) for each point in the output image, one can obtain an image on which image stabilization is performed and in which lens distortion is corrected.

At this time, the point P (X, Y) can be found from the point p0 (x0, y0) by using the function T of expression (3) and the function D of expression (5) described above. That is, the point P0 (X0, Y0) can be found from the point p0 (x0, y0) using the function T of expression (3), and the point P (X, Y) can be found from the point P0 (X0, Y0) using the function D of expression (5). Here, letting a function F be a composite function of the function T and the function D, the point P (X, Y) is expressed by the following expression (6).

[Expression 6]

$$P(X,Y) = F(x0,y0,L,\theta_p,\theta_y,\theta_r) \quad (6)$$

On the other hand, in a case where the signal processing circuit 17 performs the correction processing to output the result in which lens distortion is not corrected as illustrated in FIG. 7 above, for example, the point p (x, y) may be regarded as the point on the output image. That is, by using the pixel value at the point P (X, Y) as a pixel value at the point p (x, y) for each point in the output image, one can obtain an image on which image stabilization is performed and in which lens distortion is not corrected.

At this time, the point P (X, Y) can be found from the point p (x, y) by using the function T of expression (3), the function U of expression (4), and the function D of expression (5) described above. That is, the point p0 (x0, y0) can be found from the point p (x, y) using the function U of expression (4), the point P0 (X0, Y0) can be found from the point p0 (x0, y0) using the function T of expression (3), and the point P (X, Y) can be found from the point P0 (X0, Y0) using the function D of expression (5). Here, letting a function G be a composite function of the function T, the function U, and the function D, the point P (X, Y) is expressed by the following expression (7).

[Expression 7]

$$P(X,Y) = G(x, y, L, \theta_p, \theta_y, \theta_r) \quad (7)$$

Note that the coordinate values of the point P (X, Y) found by expressions (6) and (7) rarely take integer values, but the pixel value in the output image can be calculated by interpolation from a pixel value of neighboring coordinates. Moreover, the pixel value at each point in the output image can be found by calculating a corresponding coordinate position on the input image using the above functions for each point. In addition, for example, the pixel value may be calculated by dividing the output image and calculating a corresponding coordinate position on the input image using the above functions only for grid points, and finding a coordinate position by interpolation for points other than the grid points.

Note that the description is herein made about calculating the pixel value at a certain timing to explain the principle briefly, but in practice, the imaging time of pixels within one screen varies depending on the pixel positions. Accordingly, the pixel value of each pixel is calculated by using the angle of rotation −θp (rad) in the pitch direction, the angle of rotation −θy (rad) in the yaw direction, and the angle of rotation −θr (rad) in the roll direction corresponding to the pixel position.

Now, the correction processing according to optical image stabilizer and electronic image stabilization is implemented by adding the amount of movement by which the OIS actuator 16 moves the lens unit 12 to the correction processing based on the function F of expression (6) and the function G of expression (7) above. Although the correction processing using the function F of expression (6) will be described below, the correction processing using the function G of expression (7) can also be executed in a manner similar to that of the correction processing using the function F of expression (6).

First, the point P0 (X0, Y0) is set as the coordinates on the input image (image with camera shake in a case where optical image stabilizer is not performed) corresponding to the coordinates of the point p0 (x0, y0) on the output image that is subjected to the correction processing according to optical image stabilizer and electronic image stabilization. At this time, as described above, the function F for calculating the coordinates according to electronic image stabilization is expressed by expression (6).

Moreover, the correction processing according to optical image stabilizer (employing the barrel shift method or sensor shift method) may be regarded as parallel movement of an image. Accordingly, coordinates $(X_{ois}, Y_{ois})$ on the input image corresponding to the coordinates p0 (x0, y0) on the output image are found by the following expression (8) using a shift amount $(x_{ois}, y_{ois})$ according to optical image stabilizer for each pixel.

[Expression 8]

$$(X_{ois}, Y_{ois}) = (X, Y) - (x_{ois}, y_{ois}) \quad (8)$$
$$= F(x0, y0, L, \theta_p, \theta_y, \theta_r) - (X_{ois}, Y_{ois})$$

As a result, an image subjected to the correction processing according to optical image stabilizer and electronic image stabilization can be output by outputting the pixel value of the coordinates $(X_{ois}, Y_{ois})$ on the input image as the pixel value of the coordinates (x0, y0) on the output image.

Note that the coordinate values of the coordinates $(X_{ois}, Y_{ois})$ found by expressions (8) rarely take integer values, but the pixel value in the output image can be calculated by interpolation from a pixel value of neighboring coordinates. Moreover, the pixel value at each point in the output image can be found by calculating a corresponding coordinate position on the input image using the above functions for each point. In addition, for example, the pixel value may be calculated by dividing the output image and calculating a corresponding coordinate position on the input image using the above functions only for grid points, and finding a coordinate position by interpolation for points other than the grid points.

Note that the description is herein made about calculating the pixel value at a certain timing to explain the principle briefly, but in practice, the imaging time of pixels within one screen varies depending on the pixel positions. Accordingly, the pixel value of each pixel is calculated by using the angle of rotation −θp (rad) in the pitch direction, the angle of rotation −θy (rad) in the yaw direction, and the angle of rotation −θr (rad) in the roll direction corresponding to the pixel position as well as the shift amount according to optical image stabilizer.

Here, a description will be given of a case where Hall data obtained by reading the position of the lens unit 12 using a Hall element is used as the position information of the lens unit 12 driven in optical image stabilizer. For example, the logic unit 22 can add the angular velocity data detected by the motion sensor 14 and the Hall data obtained by reading the position of the lens unit 12 to the image data together with the H-line counter of the image data, and output the image data to which the above data is added. At this time, the logic unit 22 performs timing adjustment to synchronize the timing at which the motion sensor 14 detects the angular velocity data and the timing at which the Hall element reads the position of the lens unit 12 on the basis of a delay time up to the timing of acquisition of the angular velocity data and the Hall data, the relationship of exposure end time and exposure time for each pixel (H line), and the like.

In this case, the coordinates (x0, y0) on the output image (image after image stabilization) are found by the following expression (9) using the shift amount $(x_{ois}, y_{ois})$ according to optical image stabilizer, Hall data values (hx, hy), Hall data (hx0, hy0) when the lens unit 12 is at the center in optical image stabilizer, and pixel count conversion factors (kx, ky).

[Expression 9]

$$(x_{ois}, y_{ois}) = (kx \cdot (hx - hx0), ky \cdot (hy - hy0)) \quad (9)$$

Then, by inputting the shift amount $(x_{ois}, y_{ois})$ found by expression (9) to the above expression (8), the coordinates $(X_{ois}, Y_{ois})$ on the input image (OIS output image) corresponding to the coordinates p0 (x0, y0) on the output image (image after image stabilization) are determined. As a result, an image on which image stabilization is performed can be created by using the pixel value of the coordinates. Here, expression (9) illustrates an example in which the conversion processing is performed assuming that the amount of change in the Hall data (hx0, hy0) and the amount of movement of the pixel position are in a linear relationship. On the other hand, in a case where they are not in a linear relationship, for example, the conversion processing is performed in accordance with the relationship between the amount of change in the Hall data (hx0, hy0) and the amount of movement of the pixel position.

Note that the pixel value at each point in the output image can be found by calculating a corresponding coordinate position on the input image using the above functions for each point. In addition, for example, the pixel value may be calculated by dividing the output image and calculating a corresponding coordinate position on the input image using the above functions only for grid points, and finding a coordinate position by interpolation for points other than the grid points.

Note that the description is herein made about calculating the pixel value at a certain timing to explain the principle briefly, but in practice, the imaging time of pixels within one screen varies depending on the pixel positions. Accordingly, the pixel value of each pixel is calculated by using the angle of rotation $-\theta p$ (rad) in the pitch direction, the angle of rotation $-\theta y$ (rad) in the yaw direction, and the angle of rotation $-\theta r$ (rad) in the roll direction corresponding to the pixel position as well as the shift amount (Hall data values (hx, hy)) according to optical image stabilizer.

<Image Stabilization Processing of Imaging Device>

Figure 15:
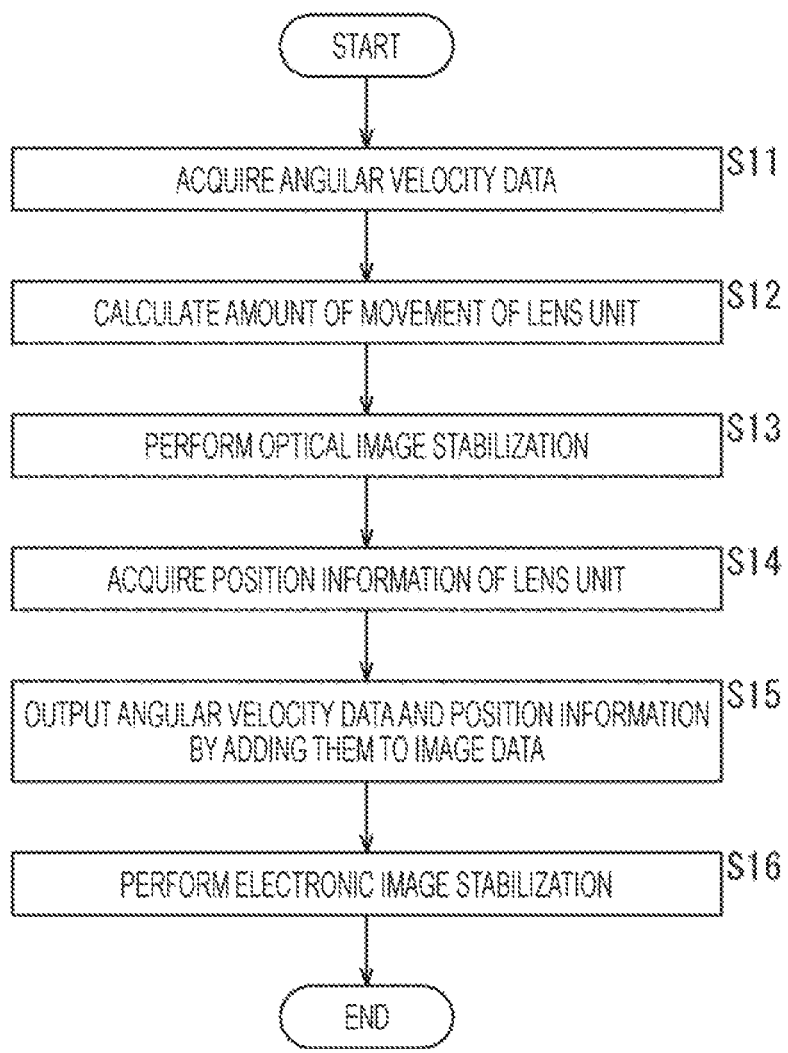
FIG. 15 is a flowchart for explaining image stabilization processing executed in an imaging method employed by the imaging device.

An example of image stabilization processing executed in an imaging method by the imaging device 11 will be described with reference to a flowchart in FIG. 15.

In the imaging device 11, for example, the image stabilization processing is started when the imaging unit 21 starts imaging of one frame, and in step S11, the OIS driver 15 acquires angular velocity data output from the motion sensor 14.

In step S12, the OIS driver 15 calculates an amount of movement by which the lens unit 12 is moved on the basis of the angular velocity data acquired in step S11, and supplies the amount of movement to the OIS actuator 16.

In step S13, the OIS actuator 16 performs optical image stabilization by driving the lens unit 12 according to the amount of movement supplied from the OIS driver 15 in step S12.

In step S14, the OIS actuator 16 detects the position of the lens unit 12 driven in step S13, and supplies position information of the lens unit 12 to the OIS driver 15. The OIS driver 15 then supplies the position information of the lens unit 12 and the angular velocity data acquired in step S11 to the logic unit 22 of the image sensor 13.

In step S15, the logic unit 22 adds the position information of the lens unit 12 and the angular velocity data supplied from the OIS driver 15 in step S14 to the image data output from the imaging unit 21 together with an H-line counter of the image data corresponding to the timing of reception of the position information and the angular velocity data, and supplies the image data to which the information and data are added to the signal processing circuit 17.

In step S16, the signal processing circuit 17 uses the position information of the lens unit 12 and the angular velocity data to perform electronic image stabilization processing on the image data supplied in step S15 according to a function that converts the position for each coordinate on the image data synchronized with the position information and the angular velocity data. The processing is thereafter ended, and similar processing is repeated each time the imaging unit 21 starts imaging of a next frame. Note that the correction processing is performed continuously without being ended in shooting of a video or the like, on a preview screen, in continuous shooting of still images, and the like in which image stabilization is performed continuously. Moreover, the processing from step S11 to step S14 is performed continuously at a preset sampling frequency.

As described above, the imaging device 11 can reliably correct blurring by reducing the occurrence of blurring within the exposure time by the optical image stabilization according to the control of the OIS driver 15, and by reducing the effect of camera shake on the image by the electronic image stabilization processing performed by the signal processing circuit 17.

Figure 16:
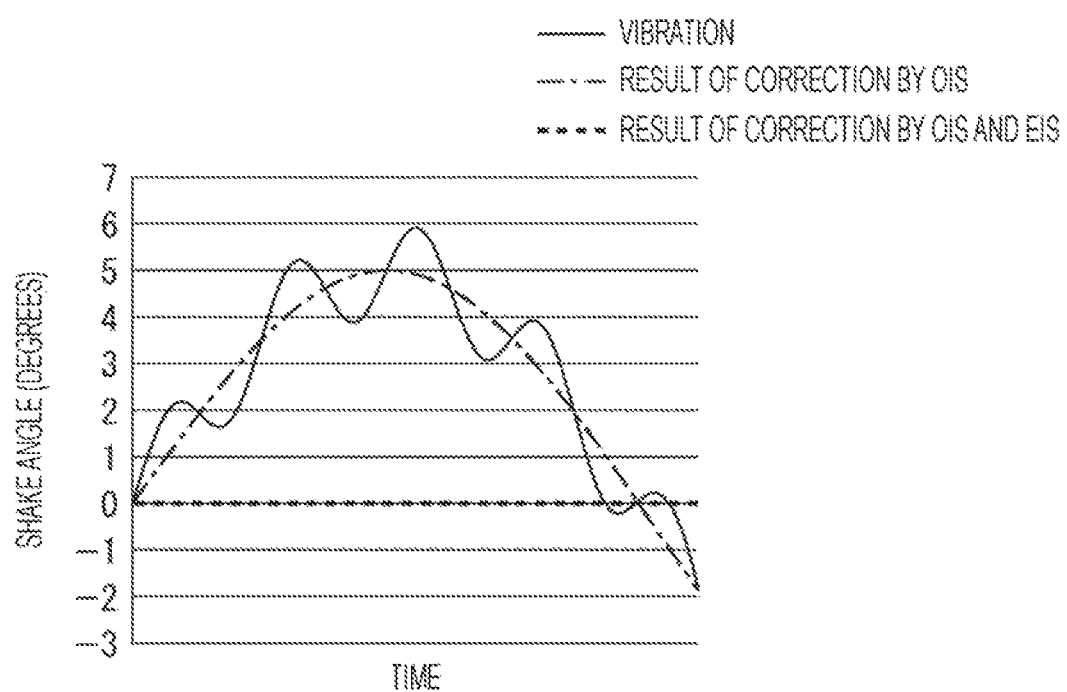
FIG. 16 is a graph for explaining a result of image correction.

A result of correction of an image captured by the imaging device 11 employing such an imaging method will be described with reference to FIG. 16.

It is assumed, for example, that the optical image stabilizer can perform correction by the angle of ±1.5 degrees while the electronic image stabilization can perform correction by the angle of ±6 degrees. At this time, with respect to vibration as illustrated in FIG. 16, the optical image stabilizer (OIS) corrects only a high frequency component to be able to produce a correction result that blurring within the exposure time is reduced. Then, the optical image stabilizer (OIS) and the electronic image stabilization (EIS) correct a low frequency component to be able to produce a correction result that the angle is kept at substantially zero degree.

As described above, the imaging device 11 performs imaging while performing the correction processing according to the optical image stabilizer, and can perform the electronic image stabilization on the image being captured by using the position information of the lens unit 12 (information of the optical image stabilizer) and the angular velocity data. The imaging device 11 can thus perform image stabilization while accommodating a difference in the amount of movement due to the position within an image plane and a difference in the amount of movement due to a gap in the exposure timing within one screen.

Therefore, the imaging device 11 can accurately correct camera shake from the center to the edge by correcting the effects of the edge deformation, lens distortion, and rolling shutter while reducing the occurrence of blurring within the exposure time not only in the imaging performed with a short exposure time such as in the daytime outdoors, but also in the imaging performed with a long exposure time such as in a dark place, or at night.

Moreover, it is typically difficult to increase the range of correction of the optical image stabilizer since the device needs to be increased in size, or large power is required for control in order to increase the range of correction. On the other hand, the imaging device 11 can perform correction on a wider range by using the electronic image stabilization to cover the range that cannot be corrected by the optical image stabilizer. Furthermore, while it is difficult for the optical image stabilizer to accommodate correction in the rotation direction, the imaging device 11 can perform correction in the rotation direction.

<Second Embodiment of Imaging Device>

Figure 17:
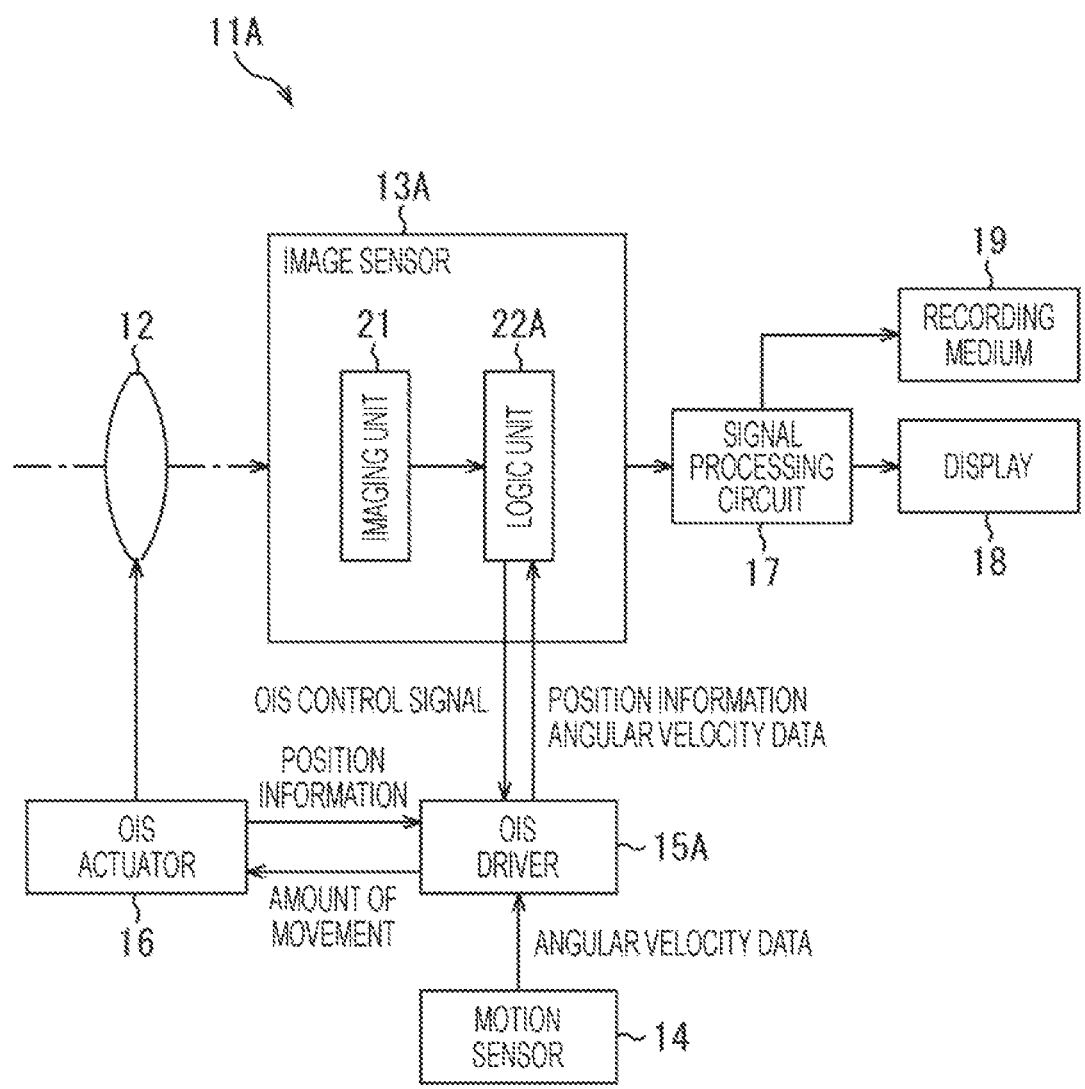
FIG. 17 is a block diagram illustrating an example of the configuration of a second embodiment of an imaging device to which the present technology is applied.

FIG. 17 is a block diagram illustrating an example of the configuration of a second embodiment of an imaging device to which the present technology is applied. Note that in an imaging device 11A illustrated in FIG. 17, a configuration common to that of the imaging device 11 in FIG. 13 will be assigned the same reference numeral as that assigned thereto and will not be described in detail.

As illustrated in FIG. 17, the imaging device 11A includes the lens unit 12, the motion sensor 14, the OIS actuator 16, the signal processing circuit 17, the display 18, the recording medium 19, and the imaging unit 21 as with the imaging device 11 of FIG. 13.

Then in the imaging device 11A, a logic unit 22A of an image sensor 13A and an OIS driver 15A have configurations different from those of the imaging device 11 in FIG. 13.

The logic unit 22A generates OIS control information instructing execution or termination of optical image stabilizer according to the exposure timing at which the imaging unit 21 performs exposure, and supplies the OIS control information to the OIS driver 15A. Such processing of generating the OIS control information according to the exposure timing of the imaging unit 21 is preferably performed in the logic unit 22A incorporated in the image sensor 13A.

The logic unit 22A generates the OIS control information on the basis of an exposure end (read end) timing and an exposure start timing of the next frame of the imaging unit 21, for example. The logic unit 22A can also specify the exposure start timing of the next frame on the basis of information such as the time between frames, the exposure time of the next frame (which changes depending on imaging conditions due to an automatic exposure function or the like). Those timings are determined and operated inside the image sensor 13A, so that the OIS control information can be generated in the logic unit 22A more easily than in the configuration in which the OIS control information is generated outside the image sensor 13A.

On the basis of the OIS control information supplied from the logic unit 22A, the OIS driver 15A performs an operation to bring the lens unit 12 back to the center position in a case where the OIS control information instructs termination of the optical image stabilizer.

Alternatively, in a case where the OIS control information is switched to one instructing execution of the optical image stabilizer while the lens unit 12 is not completely returned to the center position in the middle of the operation by the OIS driver 15A bringing the lens unit 12 back to the center position in accordance with the OIS control information instructing termination of the optical image stabilizer, the OIS driver can perform the optical image stabilizer from the position of the lens unit 12 on the way back to the center position.

The imaging device 11A configured as described above can perform the re-centering processing of the optical image stabilizer between frames by the logic unit 22A supplying the OIS control information to the OIS driver 15A. As a result, the imaging device 11A can perform the optical image stabilizer while resetting the lens position between frames, thereby being able to perform correction using the entire range of angles by which the optical image stabilizer can perform correction at all times in each frame.

That is, in a case where vibration occurs with the amplitude exceeding the angle by which the optical image stabilizer can perform correction, the imaging device 11 of FIG. 13 cannot reduce blurring within the exposure time during the vibration in the excessive range. On the other hand, the imaging device 11A performs the re-centering processing of the optical image stabilizer to be able to reduce the occurrence of blurring within the exposure time even on the occurrence of vibration with a large amplitude, if the vibration within one frame is within the angle by which the optical image stabilizer can perform correction.

The OIS control information generated by the logic unit 22A will be described with reference to FIGS. 18A and 18B.

Note that the horizontal axis of the graphs illustrated in FIGS. 18A, 18B, 19A, 19B, 20A, and 20B, represents time and illustrates a change with time. Moreover, a parallelogram in the figure schematically represents the time taken for the image data to be read while an exposure is performed from the top to the bottom of an image (which may be from the bottom to the top depending on the setting of imaging) at the time the image is captured by a CMOS image sensor. In the illustrated example, an electronic shutter is opened in order from the top of the image, and reading is performed sequentially from the top after the exposure is made for a certain time.

Figure 18A:
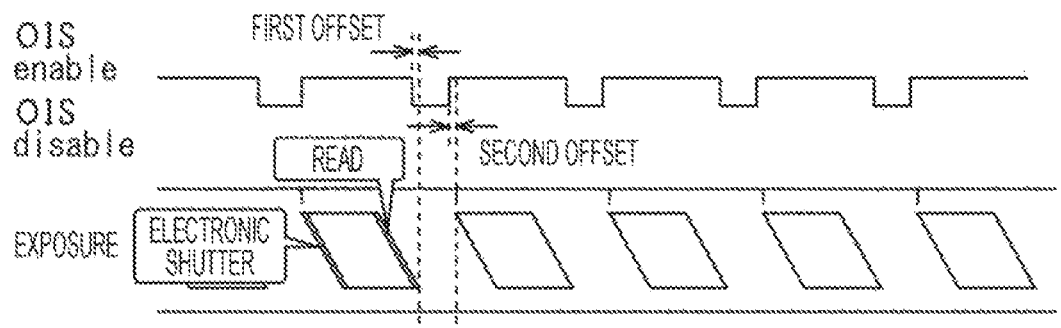
FIGS. 18A and 18B are diagrams for explaining OIS control information.

As illustrated in FIG. 18A, in a case where there is a time during which the exposure does not overlap between frames after the end of reading of the bottom of the image and before the opening of the electronic shutter at the top of the image of the next frame, the logic unit 22A outputs the OIS control information (OIS enable) instructing execution of the optical image stabilizer during the period in which the exposure is performed. Moreover, the logic unit 22A outputs the OIS control information (OIS disable) instructing termination of the optical image stabilizer during the period in which the exposure is not performed. For example, the logic unit 22A outputs the OIS control information (OIS disable) instructing termination of the optical image stabilizer in a case where the time from the end of the exposure to the start of the next exposure is longer than or equal to a predetermined time set.

Note that, in consideration of a delay in actual control, the logic unit 22A can shift the timing for switching between execution and termination of the optical image stabilizer by offset times (a first offset and a second offset illustrated in FIGS. 18A and 18B) set for the read end timing and the exposure start timing, respectively.

Figure 18B:
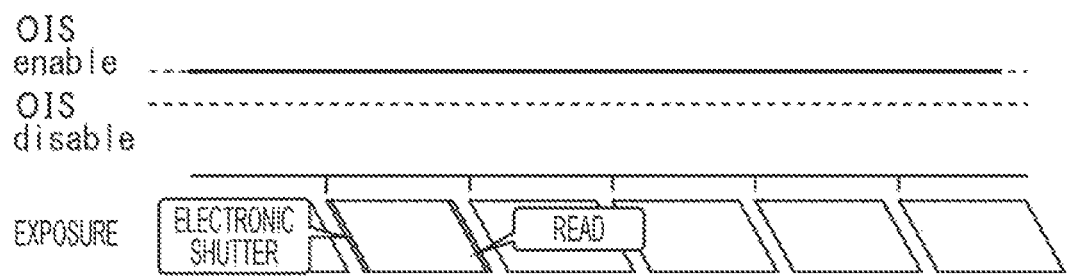

On the other hand, as illustrated in FIG. 18B, the logic unit 22A constantly outputs the OIS control information (OIS enable) instructing execution of the optical image stabilizer in the absence of a period during which the exposure does not overlap between frames or in a case where the period during which the exposure does not overlap between frames is shorter than a predetermined time set. That is, in the case where the exposure always overlaps between frames, the optical image stabilizer is performed continuously without the re-centering processing of the optical image stabilizer.

Processing of returning a control position of the optical image stabilizer to the center between frames will be described with reference to FIGS. 19A and 19B.

Figure 19A:
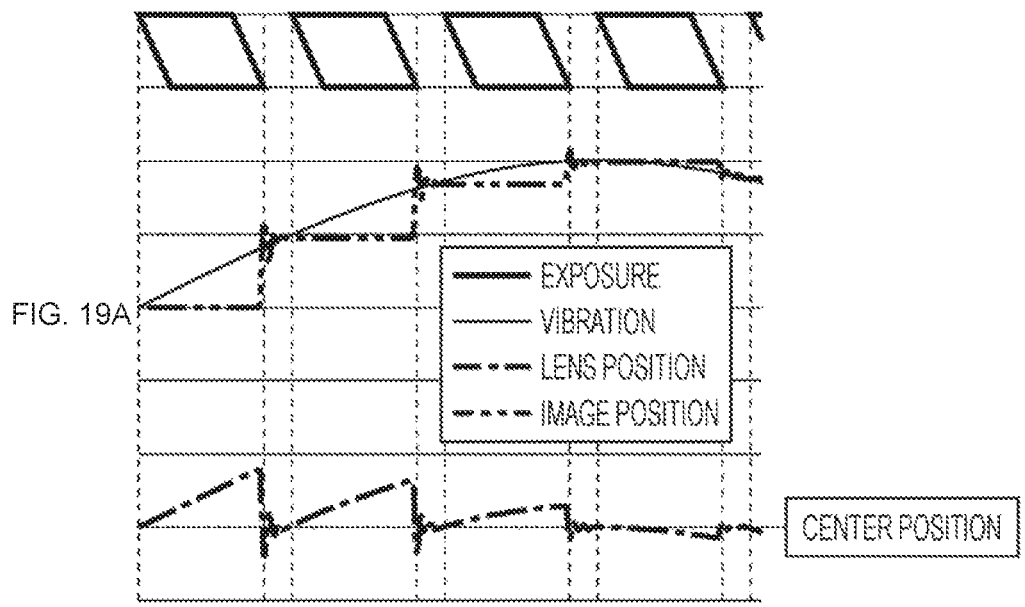
FIGS. 19A and 19B are diagrams for explaining processing of returning a control position of optical image stabilizer to a center between frames.

Illustrated in FIG. 19A is an example in which the control position of the optical image stabilizer is returned to the center immediately before the exposure is started.

In the case where the control position of the optical image stabilizer is returned to the center immediately before the exposure is started as in the figure, the optical image stabilizer can be performed by moving the lens unit 12 from the center position. Note that the effect of vibration appears on the image in a case where the exposure time is longer than the example illustrated in FIG. 19A and the exposure of the next frame is started while the control of the optical image stabilizer is not stable. In order to avoid this, the predetermined time can be set such that the OIS control information (OIS enable) instructing execution of the optical image stabilizer is constantly output in the case where the period during which the exposure does not overlap between frames is shorter than the predetermined time set.

Figure 19B:
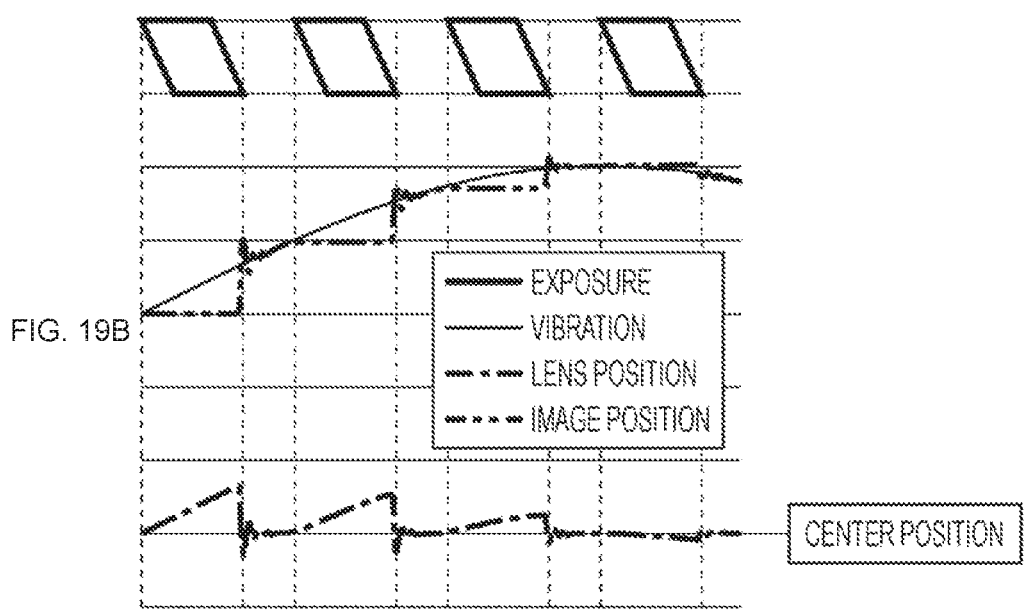

On the other hand, as illustrated in FIG. 19B, in a case where the exposure time is shorter than the example illustrated in FIG. 19A, the effect of vibration does not appear on the image so that the control position of the optical image stabilizer can be reliably returned to the center.

Incidentally, there occurs a period during which control is disabled in the presence of hunting at the time the lens unit 12 is returned to the center position as illustrated in FIGS. 19A and 19B. It is thus preferable to execute the re-centering processing of the optical image stabilizer such that the hunting does not occur at the time the lens unit 12 is returned to the center position.

In the case where the lens unit 12 can be reset to the center position between frames as described above, the range of correction of the optical image stabilizer can be secured widely at all times. On the other hand, in a case where there is not enough time to reset the lens unit 12 to the center position between frames, the re-centering processing of the optical image stabilizer cannot be executed. Moreover, the re-centering processing of the optical image stabilizer cannot be executed either in a case where the period during which the exposure does not overlap between frames is not always longer than or equal to the time for the lens unit 12 to return to the center position and be stable from the position corresponding to the maximum amount of movement.

Accordingly, instead of always returning the lens unit 12 to the center position, there can be adopted processing of returning the lens unit 12 toward the center, that is, processing of performing the optical image stabilizer in the middle of the operation that brings the lens unit 12 back to the center position.

The processing of returning the control position of the optical image stabilizer toward the center between frames will be described with reference to FIGS. 20A and 20B.

Figure 20A:
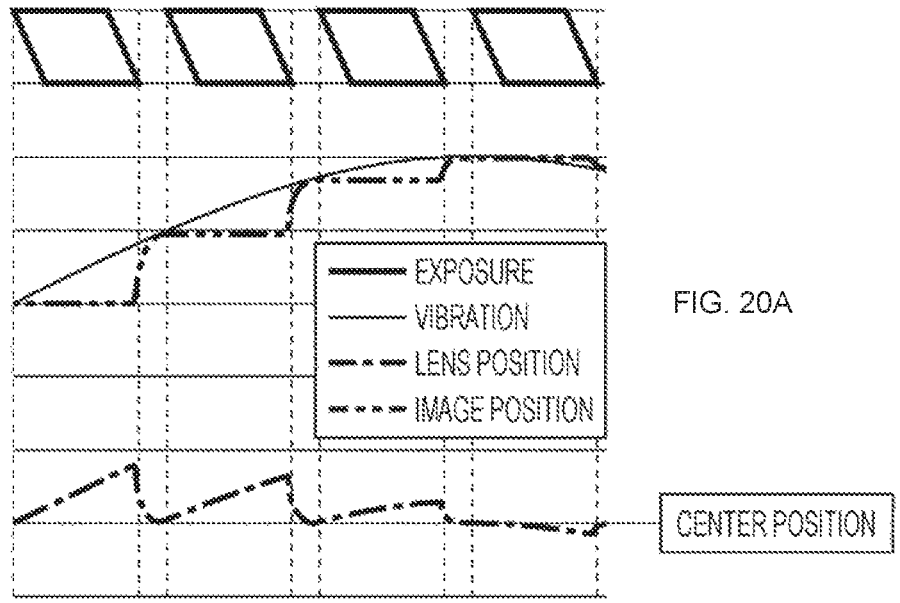
FIGS. 20A and 20B are diagrams for explaining processing of returning a control position of optical image stabilizer toward a center between frames.

As illustrated in FIG. 20A, the control is performed such that hunting does not occur at the time the lens unit 12 is returned to the center position. Moreover, FIG. 20A illustrates an example in which the control position of the optical image stabilizer is returned to the center before the exposure is started, as with FIGS. 19A and 19B.

Figure 20B:
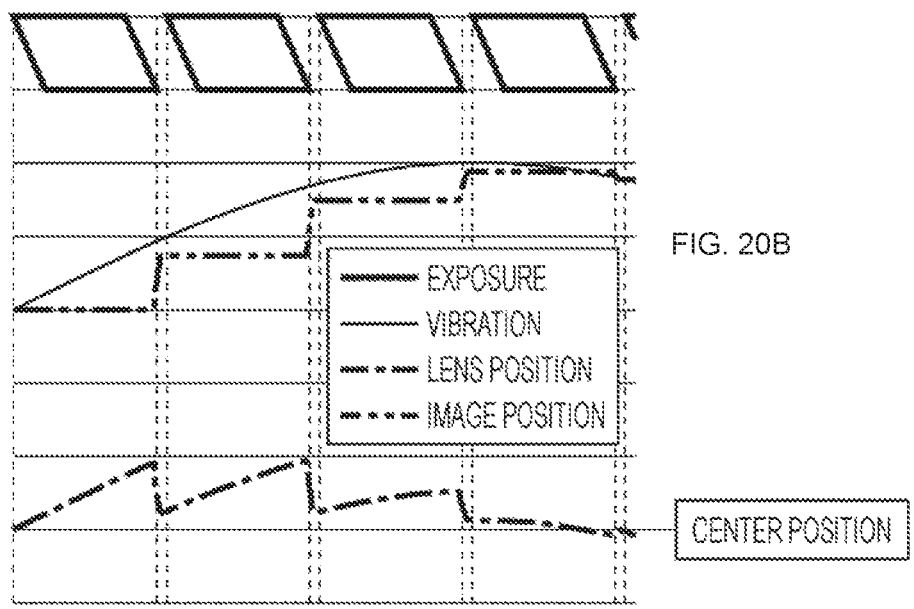

On the other hand, as illustrated in FIG. 20B, even if the control position of the optical image stabilizer is not completely returned to the center when the exposure is started, the correction processing according to the optical image stabilizer is performed from the position midway through the returning. Although the movement of the lens unit 12 is not started from the center, such control enables execution of the correction processing according to the optical image stabilizer during the exposure period so that there is no adverse effect on the image.

As described above, even in the case where the period during which the exposure does not overlap between frames is shorter than the time required to return the lens unit 12 to the center, the correctable range in the next frame can be expanded as much as possible by returning the lens unit 12 toward the center even only to some extent. That is, in this case, the control to return the lens unit 12 toward the center is performed to be able to increase the amount of movement that can be used for the optical image stabilizer in the next frame compared to when such control is not performed, whereby the occurrence of blurring within the exposure time can be reduced as much as possible.

Note that in a case where vibration occurs with the amplitude exceeding the angle by which the optical image stabilizer can perform correction during the exposure in the frame, the electronic image stabilization can be performed effectively to be able to correct blurring in the image even if the blurring within the exposure time cannot be reduced sufficiently.

Moreover, the imaging device 11A performs signal processing that performs correction on the basis of the angular velocity data output from the motion sensor 14 and the position information of the lens unit 12 for each coordinate on the image. Therefore, the signal processing circuit 17 can perform processing using the same algorithm for any of a case where the lens unit 12 is returned to the center, a case where the lens unit 12 is not completely returned to the center, a case where regular optical image stabilizer is applied, and a case where the lens unit 12 is always fixed at the center position, for example.

<Application to Still Image>

The imaging device 11 can be effectively used not only for image stabilization processing at the time of shooting a video but also for camera shake at the time of capturing a still image, where there is also a method for improving the performance of reducing camera shake in a still image.

For example, when a still image is captured in a dark environment such as in a dark place or at night, the exposure time is decreased so that the amount of light becomes insufficient and that a noisy image is captured even if imaging is performed with high gain. A long exposure time needs to be set in order to reduce the occurrence of such noise, in which case the image becomes susceptible to camera shake and has blurring in many cases.

Accordingly, the optical image stabilizer is used to reduce blurring that occurs during exposure to be able to reduce blurring in a still image captured with long exposure. However, the optical image stabilizer cannot correct the effect of lens distortion or the edge deformation as described above, so that the image is captured with blurring occurring on the edge portion though no blurring occurs in the center of the screen. Moreover, blurring on the screen cannot be reduced in a case where vibration occurs with the amplitude exceeding the range of correction of the optical image stabilizer during exposure.

On the other hand, the imaging device 11 can be effectively applied not only to image stabilization processing at the time of shooting a video but also to camera shake at the time of capturing a still image, and can reliably correct blurring from the center to the edge of the image in capturing a still image that requires long exposure.

Blurring that occurs in a still image will be described with reference to FIGS. 21A, 21B, and 21C.

Figure 21A:
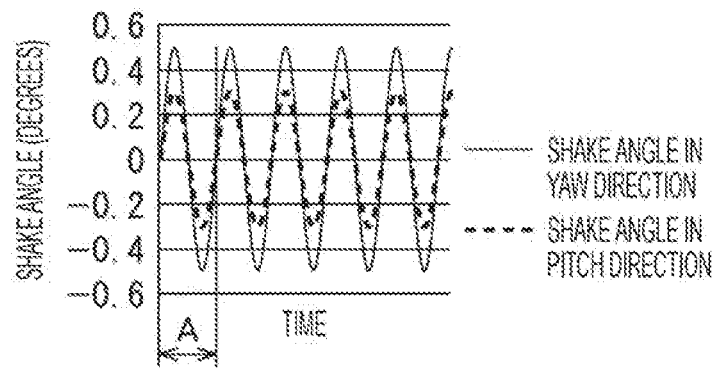
FIGS. 21A, 21B, and 21C are diagrams for explaining blurring that occurs in a still image.
Figure 21B:
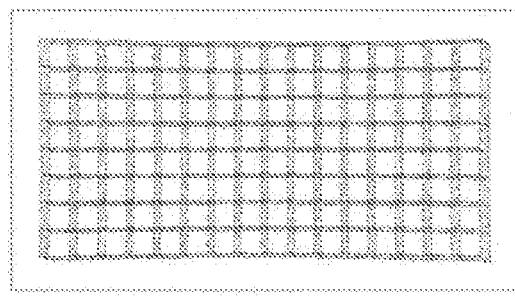
Figure 21C:
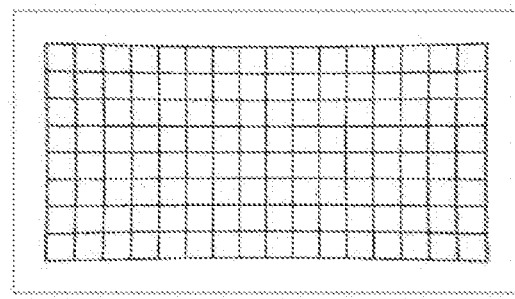

Each of FIGS. 21B and 21C illustrate a still image that is captured when exposure is performed with a cycle A under the vibration conditions as illustrated in FIG. 21A. Illustrated in FIG. 21B is a still image output without being subjected to the correction processing that corrects blurring related to vibration, while FIG. 21C illustrates a still image subjected to the correction processing according to the optical image stabilizer.

As illustrated in FIG. 21C, blurring can be reduced by performing the correction processing according to the optical image stabilizer but remains on the edge portion of the still image due to the effect of edge deformation.

A still image on which the correction processing is performed according to the image stabilization proposed in Patent Document 2 will be described with reference to FIGS. 22A and 22B.

Figure 22A:
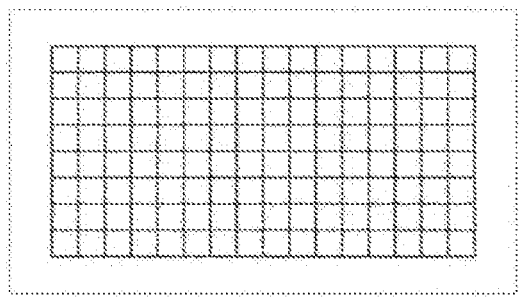
FIGS. 22A and 22B are diagrams illustrating an example of an image on which correction processing is performed according to image stabilization proposed in Patent Document 2.

Illustrated in FIG. 22A is an example of an image obtained by correcting the lens distortion itself when the correction processing according to the image stabilization in Patent Document 2 is performed, the image being obtained by superimposing eight sequential images that are each captured sequentially with the exposure time one-eighth of that of normal exposure.

Figure 22B:
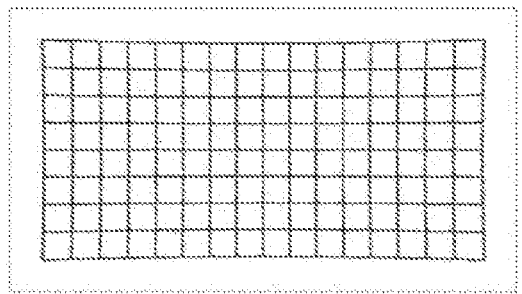

Illustrated in FIG. 22B is an example of an image obtained without correcting the lens distortion itself when the correction processing according to the image stabilization in Patent Document 2 is performed, the image being obtained by superimposing eight sequential images that are each captured sequentially with the exposure time one-eighth of that of normal exposure.

As illustrated in FIGS. 22A and 22B, the correction processing according to the image stabilization in Patent Document 2 is performed to be able to superimpose the sequential images with almost no misalignment from the center to the edge of the image. That is, the image in which the occurrence of blurring is reduced and in which blurring within the exposure time is reduced by the decrease in the exposure time can be obtained by performing the correction processing according to the image stabilization in Patent Document 2 and superimposing a plurality of sequential images sequentially captured with a short exposure time. Note that although an increase in the occurrence of noise is a concern in the case where the exposure time is decreased, the noise can be reduced by superimposing a plurality of images.

However, the correction processing according to the image stabilization in Patent Document 2 alone allows the effect of blurring within the exposure time to remain on the screen as a whole, so that the exposure time needs to be decreased further in order to make blurring within the exposure time less noticeable.

A still image on which the correction processing is performed according to the image stabilization by the imaging device 11 in FIG. 13 will be described with reference to FIGS. 23A and 23B.

Figure 23A:
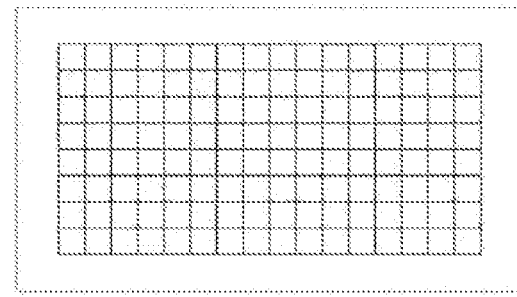
FIGS. 23A and 23B are diagrams illustrating an example of an image on which correction processing is performed according to image stabilization by the imaging device in FIG. 13.

Illustrated in FIG. 23A is an example of an image obtained by correcting the lens distortion itself when the correction processing according to the image stabilization by the imaging device 11 is performed, the image being obtained by superimposing eight sequential images that are each captured sequentially with the exposure time one-eighth of that of normal exposure.

Figure 23B:
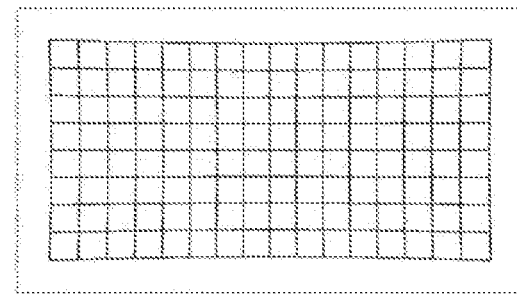

Illustrated in FIG. 23B is an example of an image obtained without correcting the lens distortion itself when the correction processing according to the image stabilization by the imaging device 11 is performed, the image being obtained by superimposing eight sequential images that are each captured sequentially with the exposure time one-eighth of that of normal exposure.

In the imaging device 11, as described above, the signal processing circuit 17 performs the correction processing according to the electronic image stabilization on the image captured by the image sensor 13 such that the occurrence of blurring is optically reduced.

As illustrated in FIGS. 23A and 23B, the sequential images can be superimposed with absolutely no occurrence of blurring from the center to the edge of the image upon reducing the occurrence of blurring within the exposure time by performing the correction processing according to the image stabilization by the imaging device 11 and superimposing a plurality of sequential images sequentially captured with a short exposure time.

Blurring that occurs in a still image by larger vibration will be described with reference to FIGS. 24A, 24B, and 24C.

Figure 24A:
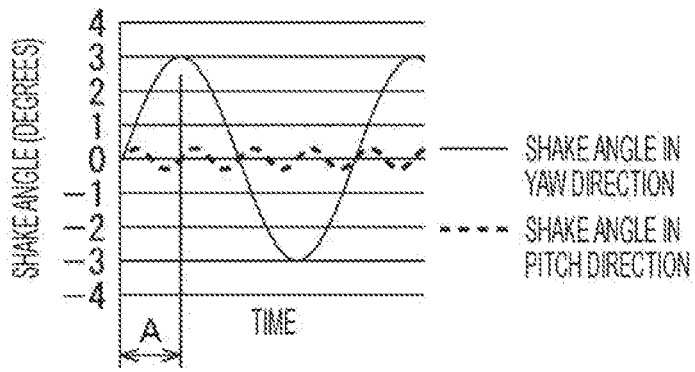
FIGS. 24A, 24B, and 24C are diagrams for explaining blurring that occurs in a still image by larger vibration.
Figure 24B:
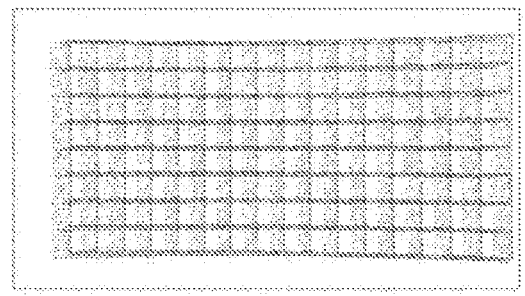
Figure 24C:
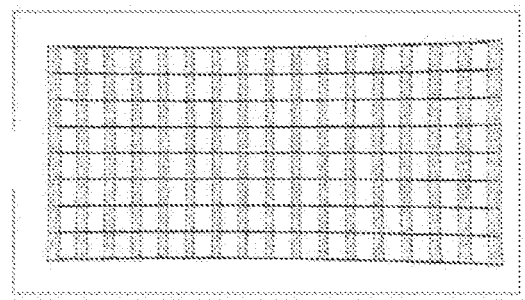

Illustrated in each of FIGS. 24B and 24C is a still image that is captured when exposure is performed with the cycle A under the vibration conditions exceeding the range of correction of the optical image stabilizer as illustrated in FIG. 24A, the range of correction being set to ±1.5 degrees. Illustrated in FIG. 24B is a still image output without being subjected to the correction processing that corrects blurring related to vibration, while FIG. 24C illustrates a still image subjected to the correction processing according to the optical image stabilizer.

As illustrated in FIG. 24A, the oscillatory wave in the yaw direction is so large as to exceed the range of correction (±1.5 degrees) of the optical image stabilizer, whereby the correction processing according to the optical image stabilizer cannot reduce blurring that occurs in the still image as illustrated in FIG. 24C.

A still image on which the correction processing is performed against the vibration illustrated in FIGS. 24A and 24B by the image stabilization proposed in Patent Document 2 will be described with reference to FIGS. 25A and 25B.

Figure 25A:
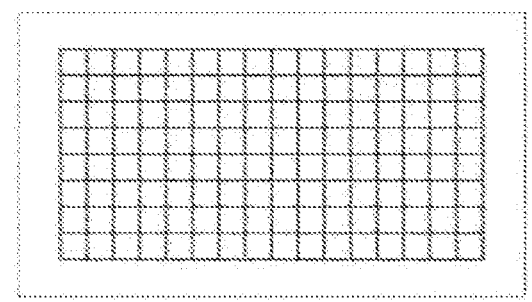
FIGS. 25A and 25B are diagrams illustrating an example of an image on which correction processing is performed according to image stabilization proposed in Patent Document 2.

Illustrated in FIG. 25A is an example of an image obtained by correcting the lens distortion itself when the correction processing according to the image stabilization in Patent Document 2 is performed, the image being obtained by superimposing eight sequential images that are captured sequentially each with the exposure time one-eighth of that of normal exposure.

Figure 25B:
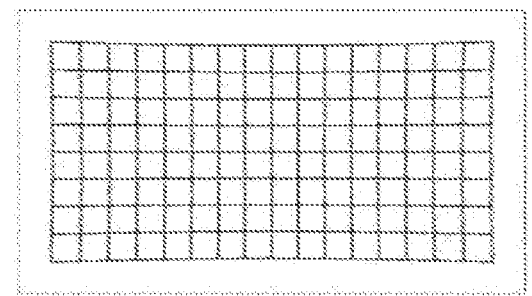

Illustrated in FIG. 25B is an example of an image obtained without correcting the lens distortion itself when the correction processing according to the image stabilization in Patent Document 2 is performed, the image being obtained by superimposing eight sequential images that are captured sequentially each with the exposure time one-eighth of that of normal exposure.

As illustrated in FIGS. 25A and 25B, the correction processing according to the image stabilization in Patent Document 2 is performed to be able to superimpose the sequential images with almost no misalignment from the center to the edge of the image. However, the image is blurred as a whole since the effect of blurring within the exposure time remains.

A still image on which the correction processing is performed against the vibration illustrated in FIG. 24A by the image stabilization of the imaging device 11 in FIG. 13 will be described with reference to FIGS. 26A and 26B.

Figure 26A:
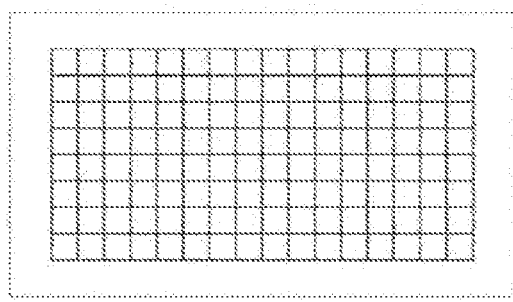
FIGS. 26A and 26B are diagrams illustrating an example of an image on which correction processing is performed according to image stabilization by the imaging device in FIG. 13.

Illustrated in FIG. 26A is an example of an image obtained by correcting the lens distortion itself when the correction processing according to the image stabilization of the imaging device 11 is performed, the image being obtained by superimposing eight sequential images that are captured sequentially each with the exposure time one-eighth of that of normal exposure.

Figure 26B:
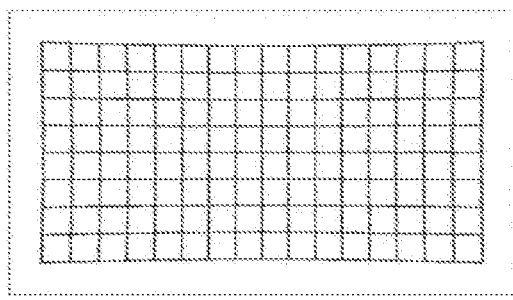

Illustrated in FIG. 26B is an example of an image obtained without correcting the lens distortion itself when the correction processing according to the image stabilization of the imaging device 11 is performed, the image being obtained by superimposing eight sequential images that are captured sequentially each with the exposure time one-eighth of that of normal exposure.

In the imaging device 11, as described above, the signal processing circuit 17 performs the correction processing according to the electronic image stabilization on the image captured by the image sensor 13 such that the occurrence of blurring is optically reduced.

As illustrated in FIGS. 26A and 26B, the sequential images can be superimposed without misalignment from the center to the edge of the image upon reducing the occurrence of blurring within the exposure time by performing the correction processing according to the image stabilization by the imaging device 11 and superimposing a plurality of sequential images sequentially captured with a short exposure time. However, the effect of blurring within the exposure time remains by the amount by which the amplitude of the vibration occurring exceeds the range of correction of the optical image stabilization, whereby the image is blurred as a whole though less blurry than the example of FIGS. 25A and 25B.

A still image on which the correction processing is performed against the vibration illustrated in FIG. 24A by the image stabilization of the imaging device 11A in FIG. 17 will be described with reference to FIGS. 27A and 27B.

Figure 27A:
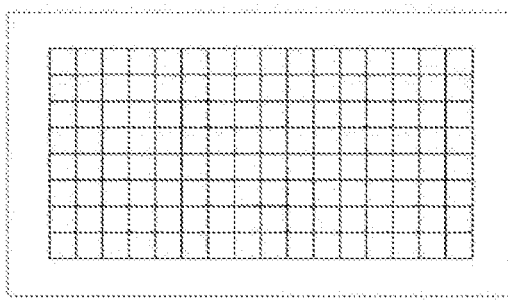
FIGS. 27A and 27B are diagrams illustrating an example of an image on which correction processing is performed according to image stabilization by the imaging device in FIG. 17.

Illustrated in FIG. 27A is an example of an image obtained by correcting the lens distortion itself when the correction processing according to the image stabilization by the imaging device 11A is performed, the image being obtained by superimposing eight sequential images that are captured sequentially each with the exposure time one-eighth of that of normal exposure.

Figure 27B:
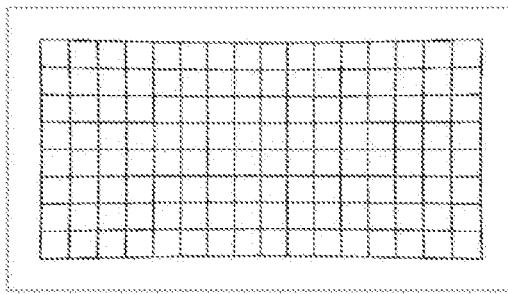

Illustrated in FIG. 27B is an example of an image obtained without correcting the lens distortion itself when the correction processing according to the image stabilization by the imaging device 11A is performed, the image being obtained by superimposing eight sequential images that are captured sequentially each with the exposure time one-eighth of that of normal exposure.

In the imaging device 11A, as described above, the signal processing circuit 17 performs the correction processing according to the electronic image stabilization on the image captured by the image sensor 13 such that the occurrence of blurring is optically reduced while the re-centering processing of the optical image stabilizer is performed.

As illustrated in FIGS. 27A and 27B, the sequential images can be superimposed without misalignment from the center to the edge of the image and at the same time the effect of blurring within the exposure time can be substantially reduced by performing the correction processing according to the image stabilization by the imaging device 11A and superimposing a plurality of sequential images sequentially captured with a short exposure time while performing the re-centering processing of the optical image stabilizer.

As described with reference to FIGS. 21A, 21B, 21C, 22A, 22B, 23A, 23B, 24A, 24B, 24C, 25A, 25B, 26A, 26B, 27A, and 27B, the image stabilization processing to which the present technology is applied is effective for further correcting blurring in the still image when combined with the processing that superimposes a plurality of sequential images sequentially captured with a short exposure time.

Moreover, the imaging device 11 of the present embodiment does not require processing of comparing image data unlike a configuration that uses an image subjected to the optical image stabilizer to detect a movement vector by comparing image data and perform the electronic image stabilization, for example. The imaging device 11 can thus correct blurring with high accuracy by the processing having less load.

Furthermore, as compared to the processing disclosed in Patent Document 1 described above, for example, the imaging device 11 of the present embodiment performs correction on the basis of the angular velocity data output from the motion sensor 14 and the position information of the lens unit 12 even in the occurrence of an error in the control of the optical image stabilizer, thereby being able to avoid the image being affected by the error.

Note that each processing described with reference to the aforementioned flowchart need not be performed chronologically in the order listed in the flowchart but includes processing executed concurrently or separately (for example, parallel processing or processing performed by an object). Moreover, the program may be processed by a single CPU or processed in a distributed manner by a plurality of CPUs.

Furthermore, although the above embodiment describes the configuration of the imaging device 11, the present invention can also be applied to a camera module including at least the image sensor 13, the motion sensor 14, the OIS driver 15, the OIS actuator 16, and the signal processing circuit 17, or various electronic apparatuses equipped with the camera module.

Furthermore, the imaging device 11 need not include the logic unit 22 performing the electronic image stabilization on the image output from the image sensor 13. That is, the function of the logic unit 22 may be included in a unit different from the imaging device 11 to allow output of image data to which the position information of the lens unit 12 and the angular velocity data in synchronization with the position on the image are added. As a matter of course, the image stabilization processing can be executed with high accuracy and the system can be built with ease by adopting the configuration in which the imaging device 11 includes the logic unit 22, more preferably, the configuration in which the signal processing circuit 17 is included on the semiconductor chip of the stacked image sensor 13.

Figure 28:
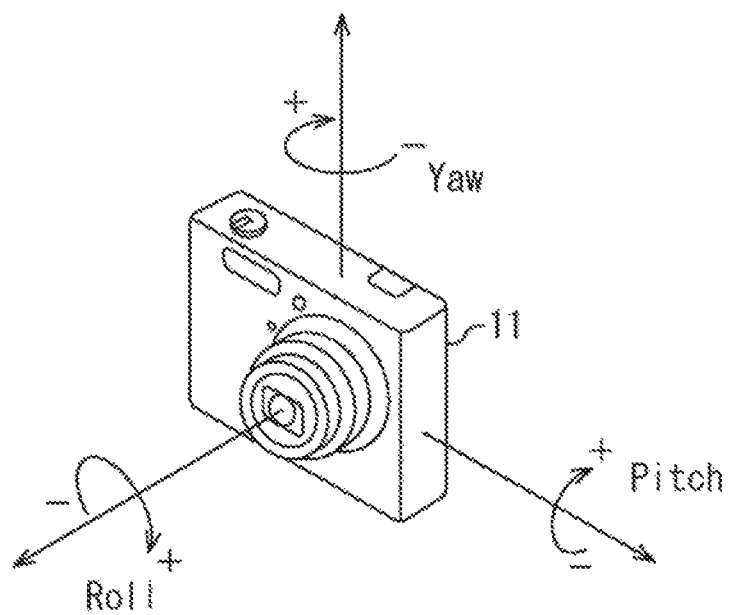
FIG. 28 is a diagram illustrating definitions of a pitch direction, a yaw direction, and a roll direction.

Note that in the above embodiment, the camera shake occurring in the imaging device 11 (that is, the vibration of the image sensor 13 incorporated in the imaging device 11) is defined by the rotation in the pitch direction, the yaw direction, and the roll direction as illustrated in FIG. 28.

<Example of Use of Image Sensor>

Figure 29:
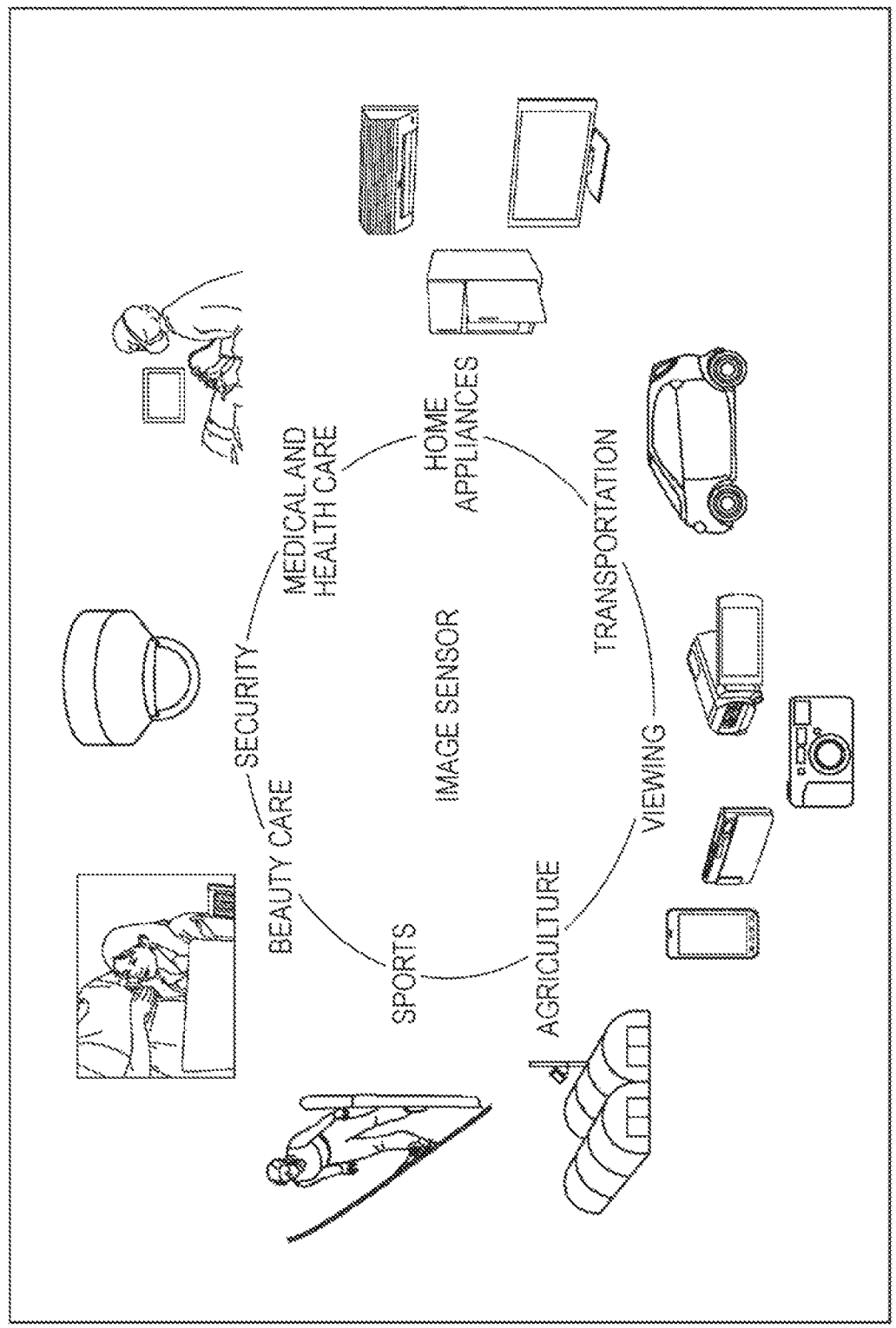
FIG. 29 is a diagram illustrating an example in which an image sensor is used.

FIG. 29 is a diagram illustrating an example in which the aforementioned image sensor is used.

The aforementioned image sensor can be used in various cases for sensing light such as visible light, infrared light, ultraviolet light, or X-rays as described below, for example.

- A device such as a digital camera or a portable device with a camera function for photographing an image to be used for viewing
- A device for use in transportation such as an in-vehicle sensor that photographs the front, back, periphery, interior, and the like of a vehicle for safe driving such as automatic stop, recognizing the condition of a driver, or the like, a surveillance camera that monitors traveling vehicles and roads, or a range sensor that measures the distance between vehicles and the like
- A device for use in home appliances such as a TV, a refrigerator, or an air conditioner to photograph a gesture of a user and operate an appliance in accordance with the gesture
- A device for use in medical and health care such as an endoscope or a device that performs angiography by receiving infrared light
- A device for use in security such as a surveillance camera used for crime prevention or a camera used for person authentication A device for use in beauty care such as a skin measuring instrument that photographs skin or a microscope that photographs the scalp A device for use in sports such as an action camera or a wearable camera for sports applications and the like A device for use in agriculture such as a camera that monitors the condition of fields and crops <Example of Application to Endoscopic Surgical System>

The technology according to the present disclosure (the present technology) can be applied to various products. For example, the technology according to the present disclosure may be applied to an endoscopic surgical system.

Figure 30:
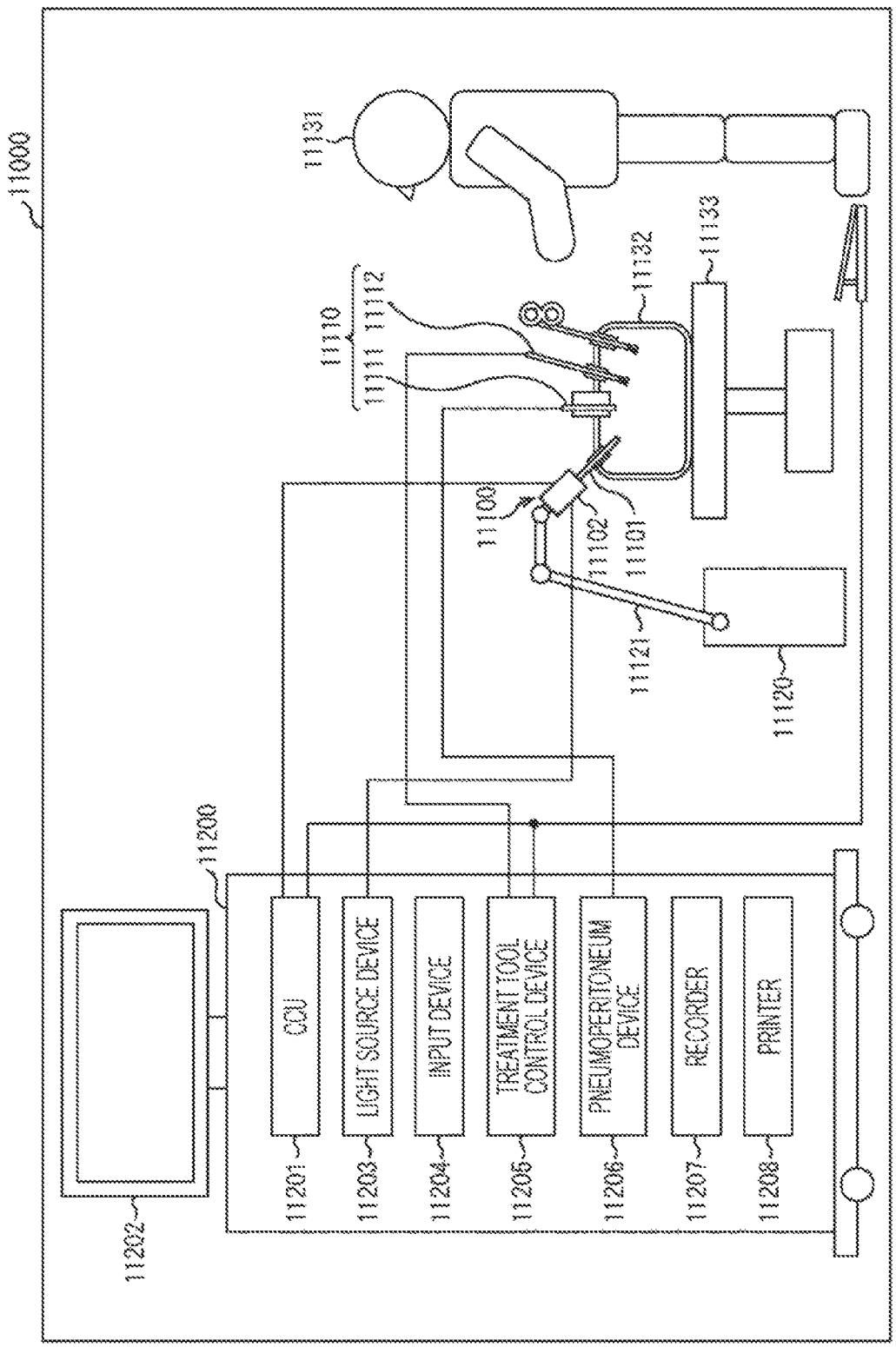
FIG. 30 is a diagram illustrating an example of a schematic configuration of an endoscopic surgical system.

FIG. 30 is a diagram illustrating an example of a schematic configuration of an endoscopic surgical system to which the technology according to the present disclosure (the present technology) can be applied.

FIG. 30 illustrates how a surgeon (doctor) 11131 performs surgery on a patient 11132 who is on a patient bed 11133 by using an endoscopic surgical system 11000. As illustrated in the figure, the endoscopic surgical system 11000 includes an endoscope 11100, other surgical instruments 11110 such as a pneumoperitoneum tube 11111 and an energy treatment tool 11112, a support arm device 11120 for supporting the endoscope 11100, and a cart 11200 carrying various devices for an endoscopic surgery.

The endoscope 11100 includes a lens barrel 11101, a predetermined length of which from the tip is inserted into the body cavity of the patient 11132, and a camera head 11102 connected to the proximal end of the lens barrel 11101. Although the example in the figure illustrates the endoscope 11100 configured as a so-called rigid scope with the lens barrel 11101 being rigid, the endoscope 11100 may be configured as a so-called flexible scope with a flexible lens barrel.

The tip of the lens barrel 11101 is provided with an opening to which an objective lens is fitted. A light source device 11203 is connected to the endoscope 11100 so that light generated by the light source device 11203 is guided to the tip of the lens barrel by a light guide extending inside the lens barrel 11101 and is projected toward an observation target in the body cavity of the patient 11132 via the objective lens. Note that the endoscope 11100 may be a direct-viewing endoscope, an oblique-viewing endoscope, or a side-viewing endoscope.

An optical system and an imaging element are provided inside the camera head 11102, and reflected light (observation light) from the observation target is concentrated on the imaging element by the optical system. The observation light is photoelectrically converted by the imaging element so that an electrical signal corresponding to the observation light, that is, an image signal corresponding to an observation image, is generated. The image signal is transmitted as RAW data to a camera control unit (CCU) 11201.

The CCU 11201 includes a central processing unit (CPU), a graphics processing unit (GPU), or the like and has control over the operations of the endoscope 11100 and a display device 11202. Moreover, the CCU 11201 receives the image signal from the camera head 11102 and performs various image processings such as development processing (demosaic processing) on the image signal for displaying an image based on the image signal, for example.

Under the control of the CCU 11201, the display device 11202 displays the image based on the image signal that is subjected to the image processing by the CCU 11201.

The light source device 11203 includes a light source such as a light emitting diode (LED), for example, and supplies irradiation light for photographing a surgical site or the like to the endoscope 11100.

An input device 11204 is an input interface for the endoscopic surgical system 11000. A user can input various information and instructions to the endoscopic surgical system 11000 via the input device 11204. For example, the user inputs an instruction or the like to change imaging conditions (the type of irradiation light, magnification, focal length, and the like) adopted by the endoscope 11100.

A treatment tool control device 11205 controls drive of the energy treatment tool 11112 for cauterizing tissue, making incisions, sealing blood vessels, or the like. A pneumoperitoneum device 11206 supplies gas into the body cavity of the patient 11132 via the pneumoperitoneum tube 11111 to inflate the body cavity for the purpose of securing a field of view for the endoscope 11100 and securing a working space for the surgeon. A recorder 11207 is a device capable of recording various information associated with surgery. A printer 11208 is a device capable of printing various information associated with surgery in various formats such as a text, an image, or a graph.

Note that the light source device 11203 supplying the irradiation light for photographing a surgical site to the endoscope 11100 can include a white light source including an LED, a laser light source, or a combination thereof, for example. The output intensity and output timing of each color (each wavelength) can be controlled with high accuracy in a case where the white light source includes a combination of RGB laser light sources, so that the white balance of a captured image can be adjusted on the light source device 11203. Moreover, in this case, an image corresponding to each of RGB can be captured by time division by projecting the laser light from each of the RGB laser light sources onto the observation target by time division and controlling the drive of the imaging element of the camera head 11102 in synchronization with the projection timing. According to this method, a color image can be obtained without a color filter provided in the imaging element.

Moreover, the light source device 11203 may be controlled to change the intensity of light to be output at predetermined time intervals. An image with a high dynamic range without so-called blackout and whiteout can be generated by controlling the drive of the imaging element of the camera head 11102 in synchronization with the timing for changing the intensity of the light to acquire images by time division and combine the images.

Furthermore, the light source device 11203 may be configured to be able to supply light in a predetermined wavelength band corresponding to special light observation. The special light observation performs so-called narrow band imaging that photographs a predetermined tissue such as a blood vessel in a mucosal surface layer with high contrast by using, for example, the wavelength dependence of light absorption in the body tissue and projecting light in a narrow band narrower than that corresponding to the irradiation light (that is, white light) at the time of regular observation. Alternatively, the special light observation may perform fluorescence observation that obtains an image by fluorescence generated by projecting excitation light. The fluorescence observation can observe fluorescence from a body tissue by projecting excitation light to the body tissue (autofluorescence observation), or obtain a fluorescent image by performing local injection of a reagent such as indocyanine green (ICG) into a body tissue and at the same time projecting excitation light corresponding to the fluorescence wavelength of the reagent to the body tissue, for example. The light source device 11203 can be configured to be able to supply narrowband light and/or excitation light corresponding to such special light observation.

Figure 31:
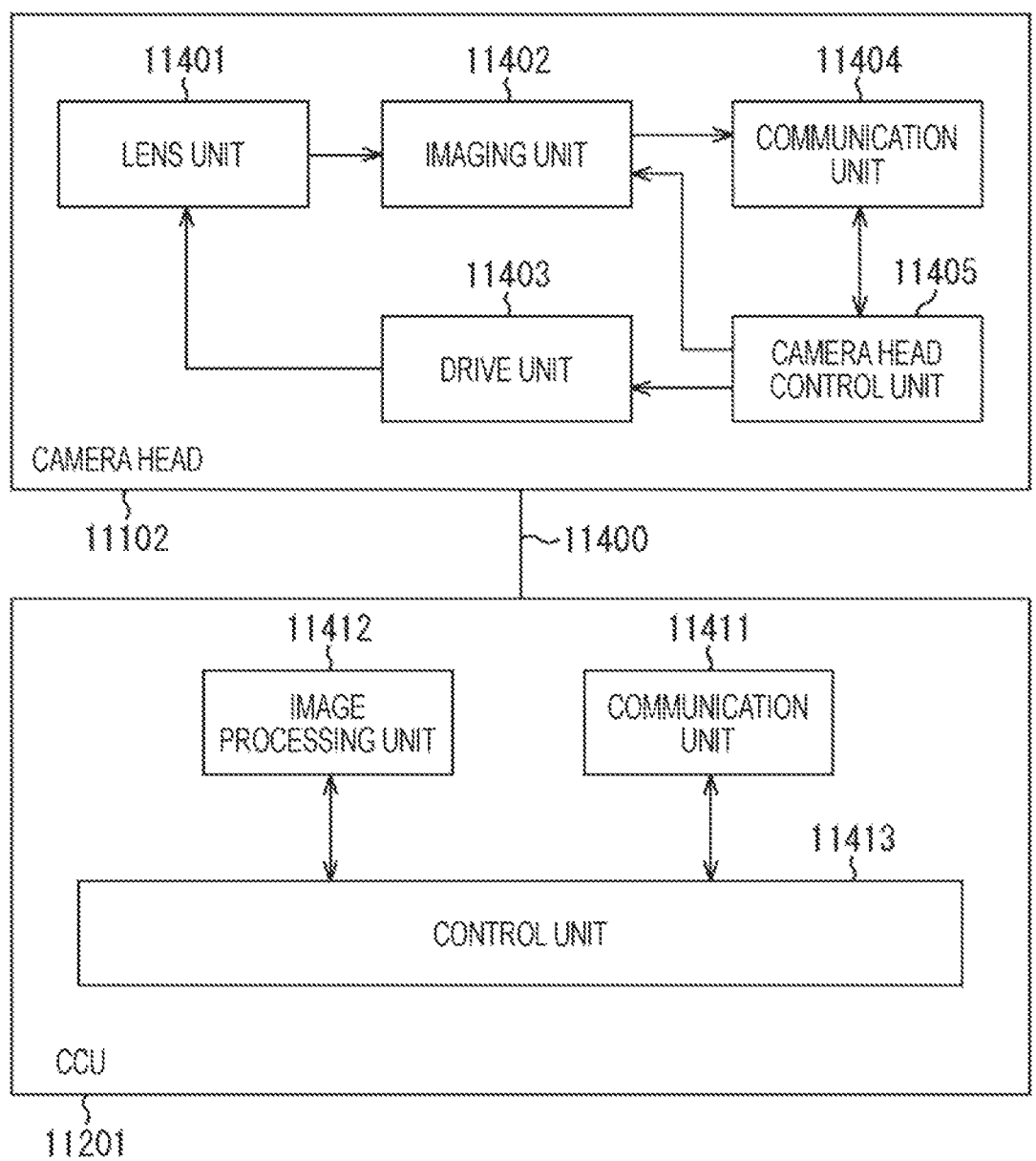
FIG. 31 is a block diagram illustrating an example of a functional configuration of a camera head and a CCU.

FIG. 31 is a block diagram illustrating an example of the functional configuration of the camera head 11102 and the CCU 11201 illustrated in FIG. 30.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are connected by a transmission cable 11400 to be able to communicate with each other.

The lens unit 11401 is an optical system provided at a junction with the lens barrel 11101. The observation light taken in from the tip of the lens barrel 11101 is guided to the camera head 11102 and enters the lens unit 11401. The lens unit 11401 includes a combination of a plurality of lenses including a zoom lens and a focus lens.

The imaging unit 11402 includes an imaging element. The imaging element included in the imaging unit 11402 may be one (a so-called single plate type) or two or more (a so-called multi-plate type) in number. In a case where the imaging unit 11402 is of the multi-plate type, for example, image signals corresponding to R, G, and B may be generated by the corresponding imaging elements and synthesized to obtain a color image. Alternatively, the imaging unit 11402 may include a pair of imaging elements for acquiring right-eye and left-eye image signals adapted for three-dimensional (3D) display. The 3D display allows the surgeon 11131 to more accurately grasp the depth of a body tissue at the surgical site. Note that in the case where the imaging unit 11402 is of the multi-plate type, a plurality of lens units 11401 corresponding to the imaging elements can be provided.

Moreover, the imaging unit 11402 is not necessarily provided in the camera head 11102. For example, the imaging unit 11402 may be provided inside the lens barrel 11101 just behind the objective lens.

The drive unit 11403 includes an actuator and moves the zoom lens and the focus lens of the lens unit 11401 by a predetermined distance along the optical axis under the control of the camera head control unit 11405. As a result, the magnification and the focus of an image captured by the imaging unit 11402 can be adjusted as appropriate.

The communication unit 11404 includes a communication device for transmitting and receiving various information to and from the CCU 11201. The communication unit 11404 transmits an image signal obtained from the imaging unit 11402 as RAW data to the CCU 11201 via the transmission cable 11400.

Moreover, the communication unit 11404 receives a control signal for controlling drive of the camera head 11102 from the CCU 11201, and supplies the control signal to the camera head control unit 11405. The control signal includes information associated with imaging conditions such as information to the effect of specifying a frame rate of a captured image, information to the effect of specifying an exposure value at the time of imaging, and/or information to the effect of specifying the magnification and focus of a captured image, for example.

Note that the above imaging conditions such as the frame rate, the exposure value, the magnification, and the focus may be specified by a user as appropriate, or may be set automatically by the control unit 11413 of the CCU 11201 on the basis of the image signal acquired. In the latter case, the so-called auto exposure (AE) function, auto focus (AF) function, and auto white balance (AWB) function are installed in the endoscope 11100.

The camera head control unit 11405 controls drive of the camera head 11102 on the basis of the control signal from the CCU 11201 received via the communication unit 11404.

The communication unit 11411 includes a communication device for transmitting and receiving various information to and from the camera head 11102. The communication unit 11411 receives an image signal transmitted from the camera head 11102 via the transmission cable 11400.

Moreover, the communication unit 11411 transmits a control signal for controlling drive of the camera head 11102 to the camera head 11102. The image signal and the control signal can be transmitted by telecommunications, optical communication, or the like.

The image processing unit 11412 performs various image processings on the image signal which is the RAW data transmitted from the camera head 11102.

The control unit 11413 performs various controls associated with imaging of the surgical site or the like by the endoscope 11100 and displaying of an image captured by the imaging of the surgical site or the like. For example, the control unit 11413 generates a control signal for controlling drive of the camera head 11102.

Moreover, the control unit 11413 causes the display device 11202 to display a captured image including the surgical site or the like on the basis of the image signal subjected to the image processing by the image processing unit 11412. At this time, the control unit 11413 may recognize various objects in the captured image by using various image recognition techniques. For example, the control unit 11413 detects the shape, color, or the like of the edge of an object included in the captured image to be able to recognize a surgical tool such as a forceps, a specific body site, bleeding, mist at the time of using the energy treatment tool 11112, and the like. When causing the display device 11202 to display the captured image, the control unit 11413 may use a result of the recognition and superimpose various surgery support information on the image of the surgical site. The surgery support information superimposed on the image and presented to the surgeon 11131 allows the surgeon 11131 to have reduced burden and proceed with the surgery reliably.

The transmission cable 11400 connecting the camera head 11102 to the CCU 11201 is an electric signal cable compatible with communication of electrical signals, an optical fiber compatible with optical communication, or a composite cable thereof.

Here, although the communication is performed by wire using the transmission cable 11400 in the illustrated example, the communication between the camera head 11102 and the CCU 11201 may be performed wirelessly.

An example of the endoscopic surgical system to which the technology according to the present disclosure can be applied has been described above. The technology according to the present disclosure can be applied to the endoscope 11100, the camera head 11102 (the imaging unit 11402 thereof), the CCU 11201 (the image processing unit 11412 thereof), and the like among the configurations described above, for example. The application of the technology according to the present disclosure as described above can obtain an image in which blurring is reliably corrected, so that the surgeon can see the surgical site with reliability.

Note that although the endoscopic surgical system has been described herein as an example, the technology according to the present disclosure may also be applied to a microscopic surgery system or the like, for example.

<Example of Application to Mobile Body>

The technology according to the present disclosure (the present technology) can be applied to various products. For example, the technology according to the present disclosure may be implemented as a device mounted on a mobile body of any type such as a vehicle, an electric vehicle, a hybrid electric vehicle, a motorcycle, a bicycle, a personal mobility, an airplane, a drone, a ship, or a robot.

Figure 32:
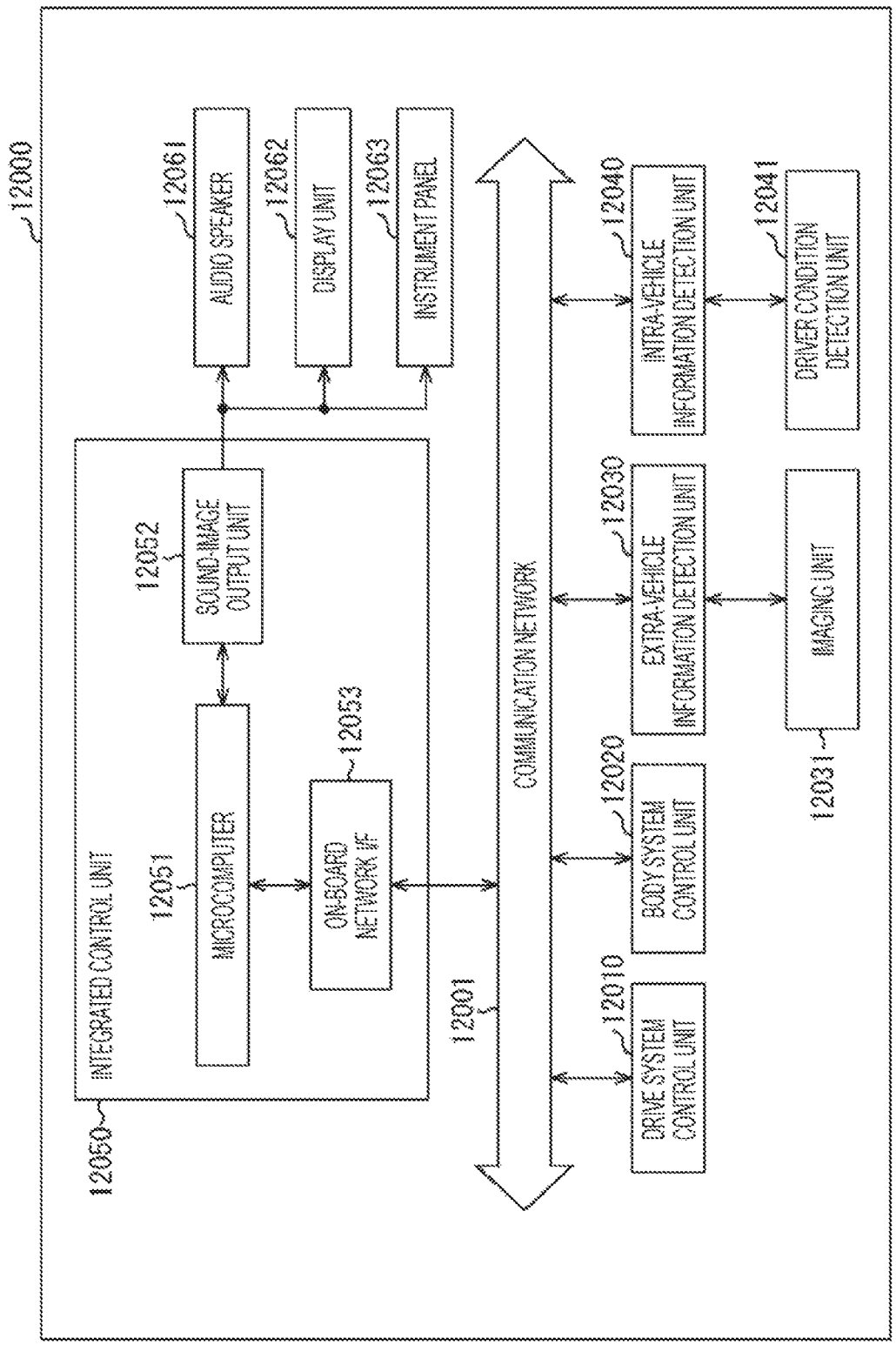
FIG. 32 is a block diagram illustrating an example of a schematic configuration of a vehicle control system.

FIG. 32 is a block diagram illustrating an example of the schematic configuration of a vehicle control system which is an example of a mobile body control system to which the technology according to the present disclosure can be applied.

A vehicle control system 12000 includes a plurality of electronic control units connected via a communication network 12001. In the example illustrated in FIG. 32, the vehicle control system 12000 includes a drive system control unit 12010, a body system control unit 12020, an extra-vehicle information detection unit 12030, an intra-vehicle information detection unit 12040, and an integrated control unit 12050. Moreover, as a functional configuration of the integrated control unit 12050, a microcomputer 12051, a sound-image output unit 12052, and an on-board network interface (I/F) 12053 are illustrated.

The drive system control unit 12010 controls the operation of a device associated with a drive system of a vehicle according to various programs. For example, the drive system control unit 12010 functions as a controller of a driving force generator such as an internal combustion engine or a driving motor for generating the driving force of the vehicle, a driving force transmitting mechanism for transmitting the driving force to the wheels, a steering mechanism for adjusting the steering angle of the vehicle, a braking device for generating the braking force of the vehicle, and the like.

The body system control unit 12020 controls the operation of various devices installed to the vehicle body according to various programs. For example, the body system control unit 12020 functions as a controller of a keyless entry system, a smart key system, a power window device, or various lamps such as a head lamp, a back lamp, a brake lamp, a turn signal, or a fog lamp. In this case, the body system control unit 12020 can receive input of radio waves transmitted from a portable device substituted for a key or signals of various switches. The body system control unit 12020 receives input of these radio waves or signals to control the door lock device, power window device, lamps, or the like of the vehicle.

The extra-vehicle information detection unit 12030 detects information regarding the outside of the vehicle on which the vehicle control system 12000 is mounted. The extra-vehicle information detection unit 12030 is connected to an imaging unit 12031, for example. The extra-vehicle information detection unit 12030 causes the imaging unit 12031 to capture an image of the outside of the vehicle and receives the image captured. The extra-vehicle information detection unit 12030 may perform object detection processing or distance detection processing for a person, a vehicle, an obstacle, a sign, a character on a road surface, or the like on the basis of the image received.

The imaging unit 12031 is an optical sensor that receives light and outputs an electrical signal corresponding to the amount of light received. The imaging unit 12031 can output the electrical signal as an image or as ranging information. Moreover, the light received by the imaging unit 12031 may be visible light or invisible light such as infrared light.

The intra-vehicle information detection unit 12040 detects information regarding the inside of the vehicle. The intra-vehicle information detection unit 12040 is connected to a driver condition detection unit 12041 for detecting the condition of a driver, for example. The driver condition detection unit 12041 includes a camera that images the driver, for example, and the intra-vehicle information detection unit 12040 may calculate a degree of fatigue or degree of concentration of the driver or may determine whether the driver is dozing off on the basis of the detection information input from the driver condition detection unit 12041.

The microcomputer 12051 calculates a control target value of the driving force generator, the steering mechanism, or the braking device on the basis of the information regarding the inside or outside of the vehicle acquired by the extra-vehicle information detection unit 12030 or the intra-vehicle information detection unit 12040, thereby being able to output a control command to the drive system control unit 12010. For example, the microcomputer 12051 can perform cooperative control for the purpose of implementing the function of an advanced driver assistance system (ADAS) including collision avoidance or impact mitigation for the vehicle, travel following a vehicle ahead, constant speed travel, or a vehicle collision warning based on the distance between vehicles, a warning for the vehicle going off the lane, or the like.

Moreover, the microcomputer 12051 controls the driving force generator, the steering mechanism, the braking device, or the like on the basis of information regarding the surroundings of the vehicle acquired by the extra-vehicle information detection unit 12030 or the intra-vehicle information detection unit 12040, thereby being able to perform cooperative control for the purpose of automated driving or the like with which a vehicle travels autonomously without depending on the driver's operation.

Furthermore, the microcomputer 12051 can output a control command to the body system control unit 12020 on the basis of the information regarding the outside of the vehicle acquired by the extra-vehicle information detection unit 12030. For example, the microcomputer 12051 can perform cooperative control for the purpose of anti-glare such as switching from high beam to low beam by controlling the head lamp depending on the position of a vehicle ahead or an oncoming vehicle detected by the extra-vehicle information detection unit 12030.

The sound-image output unit 12052 transmits an output signal of at least one of sound or image to an output device that can visually or aurally provide notification of information to a passenger of the vehicle or the outside of the vehicle. The example of FIG. 32 illustrates an audio speaker 12061, a display unit 12062, and an instrument panel 12063 as the output devices. The display unit 12062 may include at least one of an on-board display or a head-up display, for example.

Figure 33:
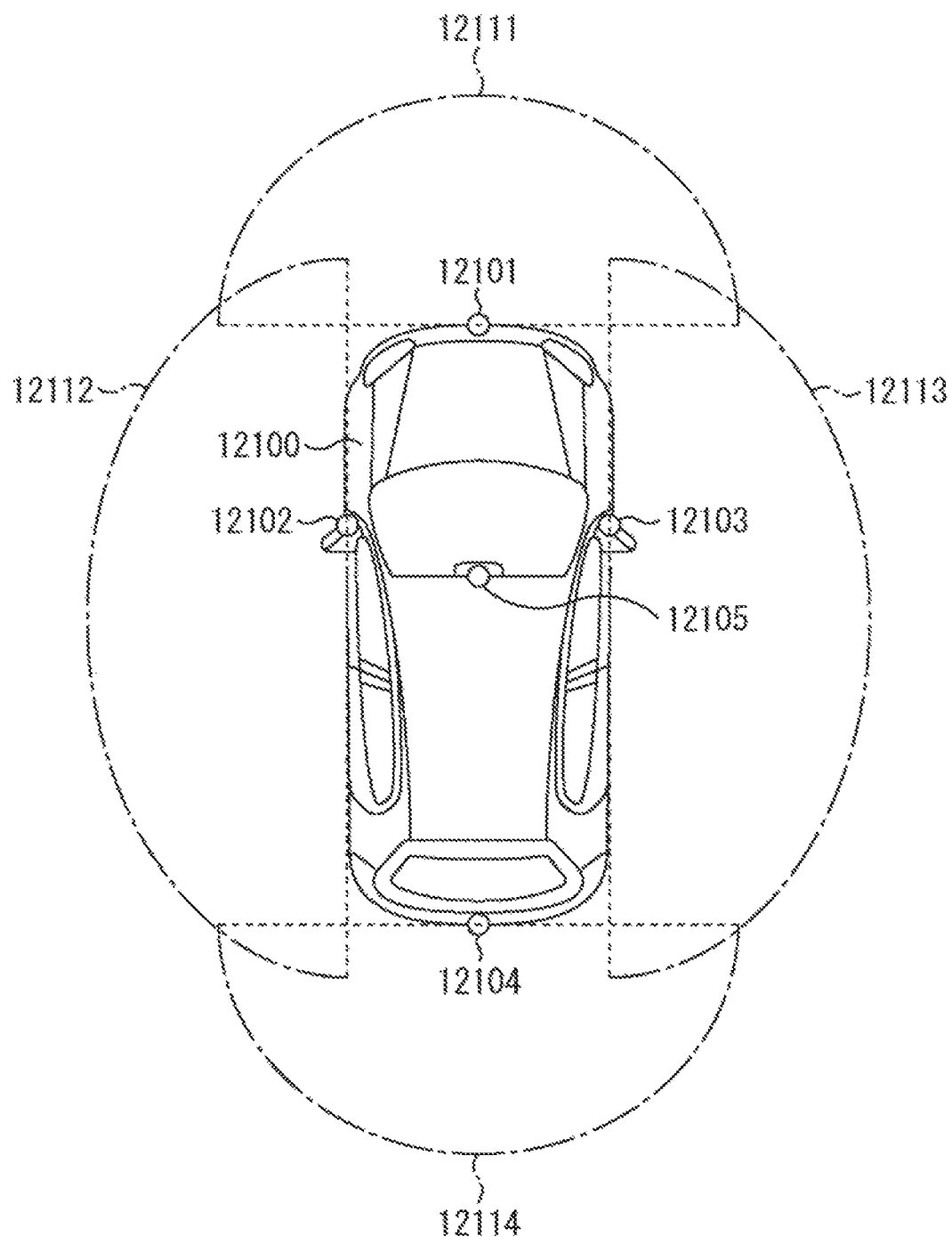
FIG. 33 is an explanatory diagram illustrating an example of the installation position of each of an extra-vehicle information detecting unit and an imaging unit.

FIG. 33 is a diagram illustrating an example of the installation position of the imaging unit 12031.

In FIG. 33, a vehicle 12100 includes imaging units 12101, 12102, 12103, 12104, and 12105 as the imaging unit 12031.

The imaging units 12101, 12102, 12103, 12104, and 12105 are installed at positions such as a front nose, side mirrors, a rear bumper, a back door, and an upper part of the windshield in the passenger compartment of the vehicle 12100, for example. The imaging unit 12101 installed at the front nose and the imaging unit 12105 installed in the upper part of the windshield in the passenger compartment mainly acquire an image of the area ahead of the vehicle 12100. The imaging units 12102 and 12103 installed on the side mirrors mainly acquire images of the sides of the vehicle 12100. The imaging unit 12104 installed on the rear bumper or the back door mainly acquires an image of the area behind the vehicle 12100. The image of the area ahead of the vehicle acquired by the imaging units 12101 and 12105 is mainly used for detecting a vehicle ahead or a pedestrian, an obstacle, a traffic light, a traffic sign, a lane, or the like.

Note that FIG. 33 illustrates an example of the imaging range of the imaging units 12101 to 12104. An imaging range 12111 indicates the imaging range of the imaging unit 12101 installed at the front nose, imaging ranges 12112 and 12113 indicate the imaging ranges of the imaging units 12102 and 12103 installed on the side mirrors, respectively, and an imaging range 12114 indicates the imaging range of the imaging unit 12104 installed on the rear bumper or the back door. For example, a bird's eye view image of the vehicle 12100 viewed from above is obtained by superimposing image data captured by the imaging units 12101 to 12104.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, on the basis of the distance information obtained from the imaging units 12101 to 12104, the microcomputer 12051 finds the distance to each three-dimensional object within the imaging ranges 12111 to 12114 and a temporal change in the distance (relative speed with respect to the vehicle 12100), thereby being able to particularly extract, as a vehicle ahead, a three-dimensional object closest on the path of travel of the vehicle 12100 and traveling at a predetermined speed (for example, 0 km/h or faster) in substantially the same direction as that of the vehicle 12100. Moreover, the microcomputer 12051 can set in advance the distance between vehicles to be secured behind a vehicle ahead, thereby being able to perform automatic brake control (including follow-up stop control), automatic acceleration control (including follow-up start control), and the like. The microcomputer can thus perform the cooperative control for the purpose of automated driving or the like with which a vehicle travels autonomously without depending on the driver's operation.

For example, on the basis of the distance information obtained from the imaging units 12101 to 12104, the microcomputer 12051 classifies three-dimensional object data associated with a three-dimensional object into a two-wheeled vehicle, a standard sized vehicle, a large sized vehicle, a pedestrian, and other three-dimensional objects such as a utility pole, and extracts the data for use in automatic avoidance of an obstacle. For example, the microcomputer 12051 identifies an obstacle in the vicinity of the vehicle 12100 as an obstacle that can be visually recognized by the driver of the vehicle 12100 or an obstacle that cannot easily be visually recognized by the driver. Then, the microcomputer 12051 determines the risk of collision indicating the degree of risk of collision with each obstacle, and under circumstances where there is a possibility of collision with the risk of collision higher than or equal to a set value, the microcomputer can perform driver assistance to avoid collision by outputting an alarm to the driver via the audio speaker 12061 and/or the display unit 12062 or performing forced deceleration or evasive steering via the drive system control unit 12010.

At least one of the imaging units 12101 to 12104 may be an infrared camera for detecting infrared light. For example, the microcomputer 12051 can recognize a pedestrian by determining whether or not a pedestrian is present in images captured by the imaging units 12101 to 12104. Such pedestrian recognition is performed by a procedure of extracting feature points in the images captured by the imaging units 12101 to 12104 as infrared cameras, for example, and a procedure of performing pattern matching on a series of feature points indicating the outline of an object and determining whether or not the object corresponds to a pedestrian. If the microcomputer 12051 determines that a pedestrian is present in the images captured by the imaging units 12101 to 12104 and recognizes the pedestrian, the sound-image output unit 12052 controls the display unit 12062 such that a rectangular contour for emphasis is superimposed and displayed on the pedestrian being recognized. The sound-image output unit 12052 may also control the display unit 12062 to display an icon or the like indicating the pedestrian at a desired position.

An example of the vehicle control system to which the technology according to the present disclosure can be applied has been described above. The technology according to the present disclosure can be applied to the imaging unit 12031 and the like among the configurations described above, for example. The application of the technology according to the present disclosure as described above can obtain an image in which blurring is reliably corrected.

Note that the present technology can also be embodied in the following configurations.

(1)

An imaging device including:

an imaging unit that captures an image of a subject via an optical system collecting light from the subject;

a drive control unit that controls drive of at least one of the optical system or the imaging unit by finding, on the basis of motion of the imaging unit that is physically detected, an amount of movement at the time at least one of the optical system or the imaging unit is moved relative to another to optically correct blurring appearing in the image captured by the imaging unit; and a signal processing unit that performs signal processing for correcting an effect of the motion of the imaging unit on the image according to a position conversion function based on position information and motion information synchronized with each coordinate on the image, on the basis of the position information obtained by detecting a position of the optical system or the imaging unit driven according to the control by the drive control unit and the motion information indicating the motion of the imaging unit physically detected.

(2)

The imaging device according to (1) above, further including a logic unit that supplies the position information, the motion information, and timing information to the signal processing unit together with the image captured by the imaging unit, the timing information indicating a timing for synchronizing the position information and the motion information with a coordinate on the image.

(3)

The imaging device according to (2) above, in which
the logic unit adds the position information and the motion information together with the timing information to the image and outputs the image to which the information is added.

(4)

The imaging device according to (2) above, in which
the logic unit outputs, as the timing information, a piece of information indicating a position in a vertical direction on the image in association with the position information and the motion information by the line of the position in the vertical direction.

(5)

The imaging device according to any of (2) to (4) above, further including
an image sensor in which the imaging unit and the logic unit are stacked, in which
the image sensor supplies the position information, the motion information, and the timing information together with the image to the signal processing unit.

(6)

The imaging device according to any of (1) to (5) above, further including
a drive unit that drives at least one of the optical system or the imaging unit according to the amount of movement found by the drive control unit, detects the position of the optical system or the imaging unit being driven, and supplies the position information to the drive control unit.

(7)

The imaging device according to any of (2) to (6) above, further including
a detection unit that physically detects the motion of the imaging unit and supplies the motion information to the drive control unit, in which
the drive control unit supplies the position information and the motion information to the logic unit.

(8)

The imaging device according to any of (2) to (5) above, in which
the logic unit generates and supplies, to the drive control unit, control information instructing execution or termination of the optical correction according to an exposure timing at which the imaging unit performs exposure, and
on the basis of the control information, the drive control unit controls drive of at least one of the optical system or the imaging unit to cause the optical system or the imaging unit to perform optical correction on blurring that appears in the image captured by the imaging unit during a period of execution of the optical correction, and controls drive to bring the optical system or the imaging unit back to a center position during termination of the optical correction.

(9)

The imaging device according to (8) above, in which
in a case where a period for which the control information instructs termination of the optical correction is shorter than time required to bring the optical system or the imaging unit back to the center position, the drive control unit controls drive to move the optical system or the imaging unit toward the center to the extent that the optical system or the imaging unit can be moved within the period.

(10)

The imaging device according to any of (1) to (9) above, in which
the signal processing unit performs the signal processing at the time of performing processing that outputs a still image obtained by superimposing a plurality of sequential images captured sequentially with a short exposure time.

(11)

A solid-state image sensor including:
an imaging unit that captures an image of a subject via an optical system collecting light from the subject; and a logic unit that performs processing of adding, to the image captured by the imaging unit, position information obtained by detecting a position of the optical system or the imaging unit driven according to control by a drive control unit and motion information indicating motion of the imaging unit physically detected, and outputs the image to which the position information and the motion information is added to a signal processing unit that performs signal processing for correcting an effect of the motion of the imaging unit on the image according to a position conversion function based on the position information and the motion information synchronized with each coordinate on the image on the basis of the position information and the motion information, the drive control unit controlling drive of at least one of the optical system or the imaging unit by finding, on the basis of the motion of the imaging unit that is physically detected, an amount of movement at the time at least one of the optical system or the imaging unit is moved relative to another to optically correct blurring appearing in the image captured by the imaging unit.

(12)

A camera module including:
an optical system that collects light from a subject;
an imaging unit that captures an image of the subject via the optical system;
a drive control unit that controls drive of at least one of the optical system or the imaging unit by finding, on the basis of motion of the imaging unit that is physically detected, an amount of movement at the time at least one of the optical system or the imaging unit is moved relative to another to optically correct blurring appearing in the image captured by the imaging unit; and
a logic unit that supplies position information, motion information, and timing information indicating a timing for synchronizing the position information and the motion information with a coordinate on the image to a signal processing unit together with the image captured by the imaging unit, the signal processing unit performing signal processing for correcting an effect of the motion of the imaging unit on the image according to a position conversion function based on the position information and the motion information synchronized with each coordinate on the image on the basis of the position information obtained by detecting a position of the optical system or the imaging unit driven according to the control by the drive control unit and the motion information indicating the motion of the imaging unit physically detected.

(13)

A drive control unit that controls drive of at least one of an optical system or an imaging unit by finding, on the basis of physically detected motion of the imaging unit capturing an image of a subject via the optical system collecting light from the subject, an amount of movement at the time at least one of the optical system or the imaging unit is moved relative to another to optically correct blurring appearing in the image captured by the imaging unit, and
supplies position information, which is obtained by detecting a position of the optical system or the imaging unit driven according to the control, and motion information, which indicates the physically detected motion of the imaging unit, to a logic unit that performs processing of adding the position information and the motion information to the image captured by the imaging unit and outputs the image to which the position information and the motion information is added to a signal processing unit that performs signal processing for correcting an effect of the motion of the imaging unit on the image according to a position conversion function based on the position information and the motion information synchronized with each coordinate on the image on the basis of the position information and the motion information.

(14)

An imaging method including the steps of:

controlling drive of at least one of an optical system or an imaging unit by finding, on the basis of physically detected motion of the imaging unit capturing an image of a subject via the optical system collecting light from the subject, an amount of movement at the time at least one of the optical system or the imaging unit is moved relative to another to optically correct blurring appearing in the image captured by the imaging unit; and performing signal processing for correcting an effect of the motion of the imaging unit on the image according to a position conversion function based on position information and motion information synchronized with each coordinate on the image on the basis of the position information obtained by detecting a position of the optical system or the imaging unit driven according to the control and the motion information indicating the physically detected motion of the imaging unit.

(15)

The imaging method according to (14) above, further including a step of performing processing that adds the position information and the motion information to the image captured by the imaging unit together with timing information indicating a position in a vertical direction on the image subjected to exposure at a timing of acquisition of the position information and the motion information.

Note that the present embodiment is not limited to the aforementioned embodiment, where various modifications can be made without departing from the scope of the present disclosure.

REFERENCE SIGNS LIST

11 Imaging device
12 Lens unit
13 Image sensor
14 Motion sensor
15 OIS driver
16 OIS actuator
17 Signal processing circuit
18 Display
19 Recording medium
21 Imaging unit
22 Logic unit

The invention claimed is:

1. An imaging device, comprising:
a signal processing circuit;
an optical system configured to:
receive light from a subject; and
output the received light;
an image sensor configured to capture an image of the subject based on the light output from the optical system, wherein the image sensor includes a logic circuit; and a drive control circuit configured to:
determine an amount of relative movement between the optical system and the image sensor based on motion of the image sensor; and
control drive of at least one of the optical system or the image sensor based on the determined amount of relative movement to optically correct a blur in the captured image, wherein
the logic circuit is configured to output position information of the at least one of the optical system or the image sensor, motion information that indicates the motion of the image sensor, timing information, and the captured image to the signal processing circuit,
the timing information indicates a timing for synchronization of the position information and the motion information with each coordinate of a plurality of coordinates on the captured image, and
the signal processing circuit is configured to:
synchronize the position information and the motion information with each coordinate of the plurality of coordinates on the captured image based on the timing information; and
execute a signal process to correct an effect of the motion of the image sensor on the captured image, wherein
the execution of the signal process is based on a position conversion function, and
the position conversion function is based on the synchronization of the position information and the motion information with each coordinate of the plurality of coordinates on the captured image.

2. The imaging device according to claim 1, wherein the logic circuit is further configured to:
add the position information, the motion information, and the timing information to the captured image; and
output the captured image to which the position information, the motion information, and the timing information is added.

3. The imaging device according to claim 1, wherein
the logic circuit is further configured to output a piece of information as the timing information, and
the piece of information indicates a position in a vertical direction on the captured image in association with the position information and the motion information associated with a line of the position in the vertical direction.

4. The imaging device according to claim 1, further comprising an actuator configured to:
drive the at least one of the optical system or the image sensor based on the determined amount of relative movement;
detect a position of the at least one of the optical system or the image sensor to obtain the position information; and
output the position information to the drive control circuit.

5. The imaging device according to claim 1, further comprising a motion sensor configured to:
detect the motion of the image sensor to obtain the motion information; and
output the motion information to the drive control circuit, wherein the drive control circuit is further configured to output the position information and the motion information to the logic circuit.

6. The imaging device according to claim 1, wherein
the logic circuit is further configured to:
generate control information based on an exposure timing of the image sensor, wherein the control information indicates one of execution or termination of the optical correction; and
output the control information to the drive control circuit,
the drive control circuit is further configured to control the drive of the at least one of the optical system or the image sensor based on the control information output from the logic circuit,
the drive of the at least one of the optical system or the image sensor is controlled to:
cause the at least one of the optical system or the image sensor to execute optical correction on the blur in the captured image, wherein the image is captured in a period of execution of the optical correction, and
drive the at least one of the optical system or the image sensor, to a center position of the optical system or the image sensor, during the termination of the optical correction.

7. The imaging device according to claim 6, wherein
the control information indicates the termination of the optical correction for a specific period,
the drive control circuit is further configured to control the drive of the at least one of the optical system or the image sensor to move the at least one of the optical system or the image sensor, toward the center position,
the at least one of the optical system or the image sensor is moved for the specific period, and
the specific period is shorter than a time required for the movement of the one of the optical system or the image sensor toward the center position.

8. The imaging device according to claim 1, wherein
the image sensor is further configured to capture a plurality of sequential images with a short exposure time shorter than a threshold exposure time, and
the signal processing circuit is further configured to:
execute an output process to output a still image, wherein the still image is obtained by superimposition of the plurality of sequential images; and
execute the signal process at a time of the execution of the output process.

9. A solid-state image sensor, comprising:
an imaging circuit configured to capture an image of a subject based on light output from an optical system, wherein the optical system receives the light from the subject; and
a logic circuit configured to:
add position information of at least one of the optical system or the imaging circuit, motion information that indicates motion of the imaging circuit, and timing information to the captured image, wherein
the timing information indicates a timing for synchronization of the position information and the motion information with each coordinate of a plurality of coordinates on the captured image, and
the at least one of the optical system or the imaging circuit is driven by control of a drive control circuit;
output, to a signal processing circuit, the captured image to which the position information, the motion information, and the timing information are added, wherein
the signal processing circuit:
synchronizes the position information and the motion information with each coordinate of the plurality of coordinates on the captured image, based on the timing information,
executes a process to correct an effect of the motion of the imaging circuit on the image, wherein
the execution of the signal process is based on a position conversion function, and
the position conversion function is based on the synchronization of the position information and the motion information with each coordinate of the plurality of coordinates on the captured image, and
the drive control unit controlling circuit:
determines an amount of relative movement between the optical system and the imaging circuit, wherein the amount of relative movement is determined based on the motion of the imaging circuit, and
controls drive of the at least one of the optical system or the imaging circuit based on the amount of relative movement to optically correct a blur in the captured image.

10. A camera module, comprising:
a signal processing circuit;
an optical system configured to:
receive light from a subject; and
output the received light;
an image sensor configured to capture an image of the subject based on the light output from the optical system, wherein the image sensor includes a logic circuit; and
a drive control circuit configured to
determine an amount of relative movement between the optical system and the image sensor, wherein the amount of relative movement is determined based on motion of the image sensor; and
control drive of at least one of the optical system or the image sensor based on the determined amount of relative movement to optically correct a blur in the captured image, wherein
the logic circuit is configured to output position information of the at least one of the optical system or the image sensor, motion information that indicates the motion of the image sensor, timing information, and the captured image to the signal processing circuit,
the timing information indicates a timing for synchronization of the position information and the motion information with each coordinate of a plurality of coordinates on the captured image, and
the signal processing circuit is configured to:
synchronize the position information and the motion information with each coordinate of the plurality of coordinates on the captured image based on the timing information; and
execute a signal process to correct an effect of the motion of the image sensor on the captured image, wherein
the execution of the signal process is based on a position conversion function, and
the position conversion function is based on the synchronization of the position information and the motion information with each coordinate of the plurality of coordinates on the captured image.

11. A system, comprising:

a signal processing circuit;

an image sensor configured to capture an image based on light output from an optical system, wherein the image sensor includes a logic circuit; and a drive control circuit configured to:

determine an amount of relative movement between the optical system and the image sensor based on motion of the image sensor;

control drive of at least one of the optical system or image sensor based on the determined amount of relative movement to optically correct a blur in the captured image; and output, to the logic circuit, position information of the at least one of the optical system or the image sensor and motion information that indicates the motion of the image sensor, wherein the logic circuit is configured to:

add the position information, the motion information, and timing information to the captured image, wherein the timing information indicates a timing for synchronization of the position information and the motion information with each coordinate of a plurality of coordinates on the captured image;

output, to the signal processing circuit, the captured image to which the position information, the motion information, and the timing information is added, and the signal processing circuit is configured to:

synchronize the position information and the motion information with each coordinate of the plurality of coordinates on the captured image, based on the timing information; and execute a signal process to correct an effect of the motion of the image sensor on the captured image, wherein the execution of the signal process is based on a position conversion function, and the position conversion function is based on the synchronization of the position information and the motion information with each coordinate of the plurality of coordinates on the captured image.

12. An imaging method, comprising:

capturing an image of a subject by an image sensor based on light output from an optical system, wherein the image sensor includes a logic circuit;

determining, by a drive control circuit, an amount of relative movement between the image sensor and the optical system based on motion of the image sensor;

controlling, by the drive control circuit, drive of at least one of the optical system or the image sensor based on the determined an amount of relative movement to optically correct a blur in the captured image;

outputting, by the logic circuit to a signal processing circuit, position information of the at least one of the optical system or the image sensor, motion information that indicates the motion of the image sensor, timing information, and the captured image, wherein the timing information indicates a timing for synchronization of the position information and the motion information with each coordinate of a plurality of coordinates on the captured image;

synchronizing, by the signal processing circuit, the position information and the motion information with each coordinate of the plurality of coordinates on the captured image, based on the timing information; and executing, by the signal processing circuit, a signal process to correct an effect of the motion of the image sensor on the captured image, wherein the execution of the signal process is based on a position conversion function, and the position conversion function is based on the synchronization of the position information and the motion information with each coordinate of the plurality of coordinates on the captured image.

13. The imaging method according to claim 12, further comprising:

acquiring, by the logic circuit, the position information and the motion information from the drive control circuit; and adding, by the logic circuit, the position information, the motion information, and the timing information to the captured image at a time of the acquisition of the position information and the motion information, wherein the timing information indicates a position in a vertical direction on the captured image.

* * * * *